United States Patent
Keller et al.

(10) Patent No.: US 10,451,229 B2
(45) Date of Patent: Oct. 22, 2019

(54) SKYLIGHT FIXTURE

(71) Applicant: IDEAL Industries Lighting LLC, Sycamore, IL (US)

(72) Inventors: Bernd P. Keller, Santa Barbara, CA (US); Theodore D. Lowes, Lompoc, CA (US); Michael Leung, Ventura, CA (US); Benjamin A. Jacobson, Santa Barbara, CA (US); Eric Tarsa, Goleta, CA (US); James Ibbetson, Santa Barbara, CA (US); Claudio Girotto, Santa Barbara, CA (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

(21) Appl. No.: 15/972,178

(22) Filed: May 6, 2018

(65) Prior Publication Data

US 2018/0259140 A1 Sep. 13, 2018

Related U.S. Application Data

(63) Continuation-in-part of application No. 15/419,538, filed on Jan. 30, 2017.
(Continued)

(51) Int. Cl.
*F21S 8/00* (2006.01)
*F21V 23/00* (2015.01)
(Continued)

(52) U.S. Cl.
CPC ............ *F21S 8/006* (2013.01); *F21V 23/003* (2013.01); *H05B 33/086* (2013.01);
(Continued)

(58) Field of Classification Search
CPC ......... F21S 8/006; F21S 8/026; F21V 19/005; F21V 23/003; F21Y 2105/16; F21Y 2113/13; H05B 33/086; H05B 33/0872
See application file for complete search history.

(56) References Cited

U.S. PATENT DOCUMENTS 3,517,180 A * 6/1970 Semotan ................... F21V 9/02
362/1
3,536,905 A * 10/1970 Ruff ......................... A61N 5/06
362/1
(Continued)

FOREIGN PATENT DOCUMENTS

CN 101351067 A 1/2009
CN 203851325 U 9/2014
(Continued)

OTHER PUBLICATIONS

Examiner's Answer for U.S. Appl. No. 15/192,308, dated Mar. 6, 2019, 5 pages.
(Continued)

*Primary Examiner* — Alan B Cariaso
(74) *Attorney, Agent, or Firm* — Withrow & Terranova, P.L.L.C.

(57) ABSTRACT

A lighting fixture appears as a skylight and is referred to as a skylight fixture. The skylight fixture has a sky-resembling assembly and a plurality of sun-resembling assemblies. The sky-resembling assembly has a sky-resembling optical assembly and a sky-specific light source, wherein light from the sky-specific light source exits a planar interior surface of the sky-resembling light optical assembly as skylight light. The plurality of sun-resembling assemblies are arranged adjacent one another and extend downward from a periphery of the sky-resembling assembly. Each of the plurality of sun-resembling assemblies has a sun-resembling optical assembly and a sun-specific light source, wherein light from
(Continued)

the sun-specific light source exits a planar interior surface of the sun-resembling optical assembly as sunlight light.

37 Claims, 23 Drawing Sheets

Related U.S. Application Data

(60) Provisional application No. 62/628,131, filed on Feb. 8, 2018.

(51) Int. Cl.

| | | |
|---|---|---|
| *H05B 33/08* | (2006.01) | |
| *H05B 37/02* | (2006.01) | |
| *F21Y 101/00* | (2016.01) | |
| *F21Y 115/10* | (2016.01) | |
| *F21S 8/02* | (2006.01) | |
| *F21Y 105/16* | (2016.01) | |
| *F21Y 113/13* | (2016.01) | |
| *F21Y 105/00* | (2016.01) | |
| *F21Y 105/10* | (2016.01) | |

(52) U.S. Cl.
CPC ..... *H05B 33/0872* (2013.01); *H05B 37/0218* (2013.01); *H05B 37/0272* (2013.01); *H05B 37/0281* (2013.01); *F21S 8/026* (2013.01); *F21Y 2101/00* (2013.01); *F21Y 2105/00* (2013.01); *F21Y 2105/10* (2016.08); *F21Y 2105/16* (2016.08); *F21Y 2113/13* (2016.08); *F21Y 2115/10* (2016.08)

(56) References Cited

U.S. PATENT DOCUMENTS

| | | | |
|---|---|---|---|
| 4,125,775 A * | 11/1978 | Chodak | F21V 9/02 250/504 R |
| 4,679,086 A | 7/1987 | May | |
| 4,734,830 A * | 3/1988 | Cristian | A01G 7/045 362/1 |
| 4,956,751 A * | 9/1990 | Kano | F21S 2/00 362/1 |
| 5,803,579 A | 9/1998 | Turnbull et al. | |
| 6,150,774 A | 11/2000 | Mueller et al. | |
| 6,185,444 B1 | 2/2001 | Ackerman et al. | |
| 6,234,648 B1 | 5/2001 | Börner et al. | |
| 6,357,889 B1 | 3/2002 | Duggal et al. | |
| 6,441,558 B1 | 8/2002 | Muthu et al. | |
| 6,470,453 B1 | 10/2002 | Vilhuber | |
| 6,498,440 B2 | 12/2002 | Stam et al. | |
| 6,577,073 B2 | 6/2003 | Shimizu et al. | |
| 6,600,175 B1 | 7/2003 | Baretz et al. | |
| 6,647,426 B2 | 11/2003 | Mohammed | |
| 6,788,011 B2 | 9/2004 | Mueller et al. | |
| 7,005,679 B2 | 2/2006 | Tarsa et al. | |
| 7,026,756 B2 | 4/2006 | Shimizu et al. | |
| 7,095,056 B2 | 8/2006 | Vitta et al. | |
| 7,213,940 B1 | 5/2007 | Van De Ven et al. | |
| 7,233,831 B2 | 6/2007 | Blackwell | |
| 7,255,457 B2 | 8/2007 | Ducharme et al. | |
| 7,257,551 B2 | 8/2007 | Oskorep et al. | |
| 7,344,279 B2 | 3/2008 | Mueller et al. | |
| 7,352,138 B2 | 4/2008 | Lys et al. | |
| 7,354,172 B2 | 4/2008 | Chemel et al. | |
| 7,358,679 B2 | 4/2008 | Lys et al. | |
| 7,385,359 B2 | 6/2008 | Dowling et al. | |
| 7,520,634 B2 | 4/2009 | Ducharme et al. | |
| 7,564,180 B2 | 7/2009 | Brandes | |
| 7,687,753 B2 | 3/2010 | Ashdown | |
| 7,744,242 B2 | 6/2010 | Krämer | |
| 7,768,192 B2 | 8/2010 | Van De Ven et al. | |
| 7,781,953 B2 | 8/2010 | Su | |
| 7,824,065 B2 | 11/2010 | Maxik | |
| 7,828,460 B2 | 11/2010 | Van De Ven et al. | |
| 7,828,463 B1 | 11/2010 | Willis | |
| 7,845,823 B2 | 12/2010 | Mueller et al. | |
| 7,918,581 B2 | 4/2011 | Van De Ven et al. | |
| 7,999,491 B2 | 8/2011 | Peng et al. | |
| 8,035,320 B2 | 10/2011 | Sibert | |
| 8,038,317 B2 | 10/2011 | Van De Ven et al. | |
| 8,201,966 B2 | 6/2012 | Hall et al. | |
| 8,258,722 B2 | 9/2012 | Swoboda et al. | |
| 8,362,707 B2 | 1/2013 | Draper et al. | |
| 8,436,556 B2 | 5/2013 | Eisele et al. | |
| 8,508,127 B2 | 8/2013 | Negley et al. | |
| 8,593,074 B2 | 11/2013 | Hatley et al. | |
| 8,686,641 B2 | 4/2014 | Maxik et al. | |
| 8,796,951 B2 | 8/2014 | Feri et al. | |
| 9,024,536 B2 | 5/2015 | Maxik et al. | |
| 9,030,103 B2 | 5/2015 | Pickard | |
| 9,039,746 B2 | 5/2015 | van de Ven et al. | |
| 9,155,165 B2 | 10/2015 | Chobot | |
| 9,192,013 B1 | 11/2015 | van de Ven et al. | |
| 9,241,384 B2 | 1/2016 | van de Ven et al. | |
| 9,456,482 B1 | 9/2016 | Pope et al. | |
| 9,681,510 B2 | 6/2017 | van de Ven | |
| 9,686,477 B2 | 6/2017 | Walters et al. | |
| 9,706,617 B2 | 7/2017 | Carrigan et al. | |
| 9,710,691 B1 | 7/2017 | Hatcher et al. | |
| 9,730,289 B1 | 8/2017 | Hu et al. | |
| 9,769,900 B2 | 9/2017 | Underwood et al. | |
| 9,888,546 B2 | 2/2018 | Deese et al. | |
| 9,894,740 B1 | 2/2018 | Liszt et al. | |
| 10,203,103 B2 | 2/2019 | Bendtsen et al. | |
| 2002/0145041 A1 | 10/2002 | Muthu et al. | |
| 2003/0090210 A1 | 5/2003 | Bierman | |
| 2004/0218387 A1 | 11/2004 | Gerlach | |
| 2005/0128751 A1 | 6/2005 | Roberge et al. | |
| 2005/0236998 A1 | 10/2005 | Mueller et al. | |
| 2006/0002110 A1 | 1/2006 | Dowling et al. | |
| 2006/0022214 A1 | 2/2006 | Morgan et al. | |
| 2006/0071780 A1 | 4/2006 | McFarland | |
| 2006/0074494 A1 | 4/2006 | McFarland | |
| 2006/0095170 A1 | 5/2006 | Yang et al. | |
| 2006/0106437 A1 | 5/2006 | Czeisler et al. | |
| 2006/0149607 A1 | 7/2006 | Sayers et al. | |
| 2007/0061050 A1 | 3/2007 | Hoffknecht | |
| 2007/0223219 A1 | 9/2007 | Medendorp, Jr. et al. | |
| 2008/0125161 A1 | 5/2008 | Ergen et al. | |
| 2008/0179611 A1 | 7/2008 | Chitnis et al. | |
| 2008/0215279 A1 | 9/2008 | Salsbury et al. | |
| 2008/0218334 A1 | 9/2008 | Pitchers et al. | |
| 2009/0034258 A1 | 2/2009 | Tsai et al. | |
| 2009/0045971 A1 | 2/2009 | Simons et al. | |
| 2009/0050907 A1 | 2/2009 | Yuan et al. | |
| 2009/0066473 A1 | 3/2009 | Simons | |
| 2009/0079846 A1 | 3/2009 | Chou | |
| 2009/0184616 A1 | 7/2009 | Van De Ven et al. | |
| 2009/0290765 A1 | 11/2009 | Ishii et al. | |
| 2009/0296384 A1 | 12/2009 | Van De Ven et al. | |
| 2010/0084996 A1 | 4/2010 | Van De Sluis et al. | |
| 2010/0127283 A1 | 5/2010 | van de Ven et al. | |
| 2010/0226280 A1 | 9/2010 | Burns et al. | |
| 2010/0254129 A1 | 10/2010 | Le Toquin et al. | |
| 2010/0277907 A1 | 11/2010 | Phipps et al. | |
| 2010/0301773 A1 | 12/2010 | Chemel et al. | |
| 2011/0007168 A1 | 1/2011 | Nagara et al. | |
| 2011/0031897 A1 | 2/2011 | Henig et al. | |
| 2011/0057581 A1 | 3/2011 | Ashar et al. | |
| 2011/0084614 A1 | 4/2011 | Eisele et al. | |
| 2011/0175510 A1 | 7/2011 | Rains, Jr. et al. | |
| 2011/0199004 A1 | 8/2011 | Henig et al. | |
| 2011/0211758 A1 | 9/2011 | Joshi et al. | |
| 2011/0282468 A1 | 11/2011 | Ashdown | |
| 2012/0038281 A1 | 2/2012 | Verfuerth | |
| 2012/0038291 A1 | 2/2012 | Hasnain | |
| 2012/0146518 A1 | 6/2012 | Keating et al. | |
| 2012/0306355 A1 | 12/2012 | Siebel, II | |
| 2012/0306375 A1 | 12/2012 | van de Ven | |
| 2013/0063042 A1 | 3/2013 | Bora et al. | |
| 2013/0114241 A1 | 5/2013 | van de Ven et al. | |
| 2013/0182906 A1 | 7/2013 | Kojo et al. | |

(56) References Cited

U.S. PATENT DOCUMENTS

| | | |
|---|---|---|
| 2013/0221203 A1 | 8/2013 | Barrilleaux |
| 2013/0257292 A1 | 10/2013 | Verfuerth et al. |
| 2013/0271991 A1 | 10/2013 | Hussell et al. |
| 2013/0293877 A1 | 11/2013 | Ramer et al. |
| 2014/0028199 A1 | 1/2014 | Chemel |
| 2014/0028200 A1 | 1/2014 | Van Wagoner et al. |
| 2014/0028219 A1 | 1/2014 | Chen et al. |
| 2014/0042910 A1 | 2/2014 | Chan |
| 2014/0052220 A1 | 2/2014 | Pedersen |
| 2014/0062312 A1 | 3/2014 | Reed |
| 2014/0070724 A1 | 3/2014 | Gould et al. |
| 2014/0103833 A1 | 4/2014 | Ho et al. |
| 2014/0135017 A1 | 5/2014 | Hirano et al. |
| 2014/0152188 A1 | 6/2014 | Bora et al. |
| 2014/0159577 A1 | 6/2014 | Manoukis et al. |
| 2014/0166447 A1 | 6/2014 | Thea et al. |
| 2014/0167653 A1 | 6/2014 | Chobot |
| 2014/0211985 A1 | 7/2014 | Polese et al. |
| 2014/0217261 A1 | 8/2014 | De Groot et al. |
| 2014/0228914 A1 | 8/2014 | van de Ven et al. |
| 2014/0232288 A1 | 8/2014 | Brandes et al. |
| 2014/0266916 A1 | 9/2014 | Pakzad et al. |
| 2014/0266946 A1 | 9/2014 | Bily et al. |
| 2014/0267703 A1 | 9/2014 | Taylor et al. |
| 2014/0292206 A1 | 10/2014 | Lashina et al. |
| 2014/0306620 A1 | 10/2014 | Maxik et al. |
| 2014/0340570 A1 | 11/2014 | Meyers et al. |
| 2015/0002030 A1 | 1/2015 | McRae |
| 2015/0008827 A1 | 1/2015 | Carrigan et al. |
| 2015/0021465 A1 | 1/2015 | Gettings et al. |
| 2015/0084503 A1 | 3/2015 | Liu et al. |
| 2015/0097975 A1 | 4/2015 | Nash et al. |
| 2015/0161137 A1 | 6/2015 | Lashina et al. |
| 2015/0195855 A1 | 7/2015 | Liu |
| 2015/0208490 A1 | 7/2015 | Bishop et al. |
| 2015/0216016 A1 | 7/2015 | Reed |
| 2015/0245451 A1 | 8/2015 | Sung et al. |
| 2015/0257243 A1 | 9/2015 | Saffari et al. |
| 2015/0264779 A1 | 9/2015 | Olsen et al. |
| 2015/0264784 A1 | 9/2015 | Romano |
| 2015/0309174 A1 | 10/2015 | Giger |
| 2015/0312990 A1 | 10/2015 | van de Ven et al. |
| 2015/0351169 A1 | 12/2015 | Pope et al. |
| 2015/0351191 A1 | 12/2015 | Pope et al. |
| 2015/0370848 A1 | 12/2015 | Yach et al. |
| 2016/0025273 A1 | 1/2016 | van de Ven et al. |
| 2016/0069978 A1 | 3/2016 | Rangarajan et al. |
| 2016/0095189 A1 | 3/2016 | Vangeel et al. |
| 2016/0112870 A1 | 4/2016 | Pathuri |
| 2016/0124081 A1 | 5/2016 | Charlot et al. |
| 2016/0192458 A1 | 6/2016 | Keith |
| 2016/0195252 A1 | 7/2016 | Wilcox et al. |
| 2016/0205749 A1 | 7/2016 | Creusen et al. |
| 2016/0212830 A1 | 7/2016 | Erdmann et al. |
| 2016/0227618 A1 | 8/2016 | Meerbeek et al. |
| 2016/0241765 A1 | 8/2016 | Walters et al. |
| 2016/0270179 A1 | 9/2016 | Ryhorchuk et al. |
| 2016/0273723 A1 | 9/2016 | Van Gheluwe et al. |
| 2016/0282126 A1 | 9/2016 | Watts et al. |
| 2016/0286616 A1 | 9/2016 | van de Ven |
| 2016/0286619 A1 | 9/2016 | Roberts et al. |
| 2016/0366746 A1 | 12/2016 | van de Ven et al. |
| 2017/0013697 A1 | 1/2017 | Engelen et al. |
| 2017/0048952 A1 | 2/2017 | Roberts et al. |
| 2017/0094750 A1 | 3/2017 | Chen |
| 2017/0167708 A1 | 6/2017 | Kim et al. |
| 2017/0185057 A1 | 6/2017 | Ashdown et al. |
| 2017/0228874 A1 | 8/2017 | Roberts |
| 2017/0230364 A1 | 8/2017 | Barile et al. |
| 2017/0231045 A1 | 8/2017 | Hu et al. |
| 2017/0231060 A1 | 8/2017 | Roberts et al. |
| 2017/0231061 A1 | 8/2017 | Deese et al. |
| 2017/0231066 A1 | 8/2017 | Roberts et al. |
| 2017/0366970 A1 | 12/2017 | Yu |
| 2018/0160504 A1 | 6/2018 | van de Ven et al. |
| 2018/0216791 A1 | 8/2018 | Leung et al. |
| 2018/0252374 A1 | 9/2018 | Keller et al. |

FOREIGN PATENT DOCUMENTS

| | | |
|---|---|---|
| CN | 104244539 A | 12/2014 |
| DE | 102009016918 A1 | 10/2010 |
| DE | 202014104825 U1 | 1/2016 |
| EP | 2709428 A2 | 3/2014 |
| EP | 2918901 A1 | 9/2015 |
| JP | 2008264430 A | 11/2008 |
| JP | 2009152213 A | 7/2009 |
| JP | 2010141663 A | 6/2010 |
| JP | 2012243206 A | 12/2012 |
| JP | 2016051608 A | 4/2016 |
| WO | 0034709 A1 | 6/2000 |
| WO | 2009041171 A1 | 4/2009 |
| WO | 2010004514 A1 | 1/2010 |
| WO | 2012143814 A1 | 10/2012 |
| WO | 2013085978 A2 | 6/2013 |
| WO | 2013121342 A2 | 8/2013 |
| WO | 2013158955 A1 | 10/2013 |
| WO | 2014147524 A1 | 9/2014 |
| WO | 2014165692 A1 | 10/2014 |
| WO | 2015049146 A1 | 4/2015 |
| WO | 2015103482 A1 | 7/2015 |
| WO | 2017045885 A1 | 3/2017 |

OTHER PUBLICATIONS

Author Unknown, "Marvell 88MB300 Bluetooth Microcontroller: Bluetooth 4.1 Low Energy (LE) Dual Mode System-on-Chip (SoC)," Internet of Things (IoT), 2014, Marvell Technology Group Ltd., 2 pages.

Author Unknown, "RN4020: Bluetooth® Low Energy Module," Advance Information, Mar. 25, 2014, Microchip Technology Inc., DS50002279A-p. 1 to DS50002279A-p. 26.

Duffy, Jeanne F. et al., "Effect of Light on Human Circadian Physiology," Sleep Medicine Clinic, vol. 4, Issue 2, Jun. 2009, Elsevier Inc., pp. 165-177.

Negley, Gerry, et al., "Essentials of designing efficient luminaires with LEDs," LEDs Magazine, Issue 18, Jan./Feb. 2008, Pennwell Corporation, pp. 17-22.

Rea, Mark S., et al., "Circadian Light," Journal of Circadian Rhythms, vol. 8, Issue 2, 2010, http://www.circadianrhythms.com/content/8/1/2, pp. 1-10.

Rea, M.S., et al., "White lighting for residential applications," Lighting Research and Technology, vol. 45, Issue 3, 2013, The Chartered Institution of Building Services Engineers, pp. 331-344.

Van De Ven, Antony, et al., "Warm White illumination with high CRI and high efficacy by combining 455nm excited yellowish phosphor LEDs and red AlInGaP LEDs," The First International Conference on White LEDs and Solid State Lighting, Nov. 28, 2007, LED Lighting Fixtures, Inc., 8 pages.

Walker, Rick, "Lighting using Smart Mesh," CSR Confidential, Aug. 2013, Cambridge Silicon Radio Limited, 25 pages.

Non-Final Office Action for U.S. Appl. No. 14/669,739, dated Apr. 13, 2016, 13 pages.

Final Office Action for U.S. Appl. No. 14/669,739, dated Sep. 9, 2016, 16 pages.

MacAdam, David, L., "Visual Sensitivities to Color Differences in Daylight," Journal of the Optical Society of America, vol. 32, Issue 5, May 1942, Optical Society of America, pp. 247-274.

Advisory Action and AFCP 2.0 Decision for U.S. Appl. No. 14/669,739, dated Jan. 19, 2017, 3 pages.

Notice of Allowance for U.S. Appl. No. 14/669,739, dated Feb. 28, 2017, 9 pages.

Non-Final Office Action for U.S. Appl. No. 15/179,658, dated Mar. 10, 2017, 15 pages.

Notice of Allowance for U.S. Appl. No. 15/179,658, dated Sep. 15, 2017, 9 pages.

(56) References Cited

OTHER PUBLICATIONS

Invitation to Pay Additional Fees and Partial International Search for International Patent Application No. PCT/IB2016/053454, dated Sep. 15, 2016, 8 pages.
International Preliminary Report on Patentability for International Patent Application No. PCT/IB2016/053454, dated Dec. 21, 2017, 13 pages.
International Search Report and Written Opinion for International Patent Application No. PCT/IB2016/053454, dated Jan. 19, 2017, 19 pages.
Author Unknown, "The IES TM-30-15 Method," Lighting Passport, Available online at: <<https://www.lightingpassport.com/ies-tm30-15-method.html>>, Jan. 15, 2016, 6 pages.
Cree, "Cree® J Series™ 2835 LEDs," Product Family Data Sheet: CLJ-DS8 REV 0D, Cree, Inc., Available online at: <<http://www.cree.com/led-components/media/documents/data-sheet-JSeries-2835.pdf>>, 2017, 30 pages.
Figueiro, M. G., et al., "Light at Night and Measures of Alertness and Performance: Implications for Shift Workers," Biological Research for Nursing, vol. 18, Issue 1, Feb. 19, 2015, pp. 90-100.
Jacobson, J., "CoeLux: The $40,000 Artificial Skylight Everyone Will Want," CE Pro, Available online at: <<https://www.cepro.com/article/coelux_the_40000_fake_skylight_everyone_will_want>>, Mar. 11, 2016, 9 pages.
LUMILEDS, "DS146 LUXEON 3535L Color Line," Product Datasheet, Lumileds Holding B.V., Available online at: <<https://www.lumileds.com/uploads/565/DS146-pdf>>, 2018, 18 pages.
Rea, M. S., et al., "A model of phototransduction by the human circadian system," Brain Research Reviews, vol. 50, Issue 2, Dec. 15, 2005, pp. 213-228.
Rea, M. S., et al., "Circadian light," Journal of Circadian Rhythms, vol. 8, No. 2, Feb. 13, 2010, 11 pages.
Sahin, L., et al., "Alerting effects of short-wavelength (blue) and long-wavelength (red) lights in the afternoon," Physiology & Behavior, vols. 116-117, May 27, 2013, pp. 1-7.
Seoul Semiconductor, "STB0A12D—Mid-Power LED—3528 Series Product Data Sheet," Seoul Semiconductor Co., Ltd., Revision 1.0, Available online at: <<http://www.seoulsemicon.com/upload2/3528_STB0A12D_Spec_Rev1.0.pdf>>, Jul. 21, 2017, 19 pages.
Seoul Semiconductor, "STG0A2PD—Mid-Power LED—3528 Series Product Data Sheet," Seoul Semiconductor Co., Ltd., Revision 1.0, Available online at: <<http://www.seoulsemicon.com/upload2/3528_STG0A2PD_Spec_Rev1.0.pdf>>, Jul. 21, 2017, 19 pages.
Non-Final Office Action for U.S. Appl. No. 15/886,134, dated Jun. 5, 2018, 14 pages.
Notice of Allowance for U.S. Appl. No. 15/191,753, dated Jan. 14, 2019, 23 pages.
Notice of Allowance for U.S. Appl. No. 15/849,986, dated Nov. 26, 2018, 8 pages.
Corrected Notice of Allowability and Interview Summary for U.S. Appl. No. 15/849,986, dated Jan. 14, 2019, 6 pages.
Notice of Allowance and Examiner-Initiated Interview Summary for U.S. Appl. No. 15/886,134, dated Jan. 24, 2019, 11 pages.
Final Office Action for U.S. Appl. No. 15/192,308, dated Jul. 12, 2018, 11 pages.
Notice of Allowance for U.S. Appl. No. 15/192,479, dated May 9, 2018, 7 pages.
Final Office Action for U.S. Appl. No. 15/192,035, dated Aug. 1, 2018, 20 pages.
Non-Final Office Action for U.S. Appl. No. 15/191,753, dated Aug. 1, 2018, 11 pages.
Non-Final Office Action for U.S. Appl. No. 15/849,986, dated Apr. 19, 2018, 9 pages.
Notice of Allowance for U.S. Appl. No. 15/681,941, dated Apr. 13, 2018, 8 pages.
Notice of Allowance for U.S. Appl. No. 15/681,941, dated Aug. 1, 2018, 8 pages.
Abdi, Hervé, "Metric Multidimensional Scaling (MDS): Analyzing Distance Matrices," Encyclopedia of Measurement and Statistics, 2007, Thousand Oaks, California, SAGE Publications, Inc., 13 pages.
Author Unknown, "Procrustes analysis," https://en.wikipedia.org/wiki/Procrustes_analysis, Jul. 16, 2016, Wikipedia, 5 pages.
Author Unknown, "Thread Commissioning," Revision 2.0, Jul. 13, 2015, Thread Group, Inc., www.threadgroup.org, 26 pages.
Author Unknown, "Thread Stack Fundamentals," Revision 2.0, Jul. 13, 2015, Thread Group, Inc., www.threadgroup.org, 21 pages.
Boots, Byron, et al., "A Spectral Learning Approach to Range-Only SLAM," Proceedings of the 30th International Conference on Machine Learning, vol. 28, 2013, Atlanta, Georgia, JMLR Workshop and Conference Proceedings, 8 pages.
Kobourov, Stephen, G., "Force-Directed Drawing Algorithms," Handbook of Graph Drawing and Visualization, Chapter 12, 2013, CRC Press, pp. 383-408.
Non-Final Office Action for U.S. Appl. No. 15/192,308, dated Jul. 3, 2017, 11 pages.
Non-Final Office Action for U.S. Appl. No. 15/192,479, dated Jan. 6, 2017, 17 pages.
Non-Final Office Action for U.S. Appl. No. 15/192,035, dated May 31, 2017, 19 pages.
Non-Final Office Action for U.S. Appl. No. 15/191,846, dated Mar. 22, 2017, 12 pages.
Notice of Allowance for U.S. Appl. No. 15/191,846, dated Jul. 13, 2017, 8 pages.
International Search Report and Written Opinion for International Patent Application No. PCT/US2017/016448, dated Apr. 6, 2017, 16 pages.
International Search Report and Written Opinion for International Patent Application No. PCT/US2017/016454, dated Apr. 6, 2017, 16 pages.
Final Office Action for U.S. Appl. No. 15/192,308, dated Oct. 20, 2017, 12 pages.
Advisory Action and Interview Summary for U.S. Appl. No. 15/192,308, dated Jan. 25, 2018, 5 pages.
Non-Final Office Action for U.S. Appl. No. 15/192,479, dated Dec. 15, 2017, 11 pages.
Final Office Action for U.S. Appl. No. 15/192,035, dated Sep. 14, 2017, 15 pages.
Advisory Action for U.S. Appl. No. 15/192,035, dated Dec. 1, 2017, 3 pages.
Non-Final Office Action for U.S. Appl. No. 15/192,035, dated Mar. 9, 2018, 16 pages.
Notice of Allowance for U.S. Appl. No. 15/621,695, dated Sep. 21, 2017, 8 pages.
International Search Report and Written Opinion for International Patent Application No. PCT/US2017/016469, dated Apr. 6, 2017, 16 pages.
Berclaz, J., et al., "Robust People Tracking with Global Trajectory Optimization," IEEE Computer Society Conference on Computer Vision and Pattern Recognition, Jun. 17-22, 2006, New York, New York, USA, 7 pages.
Buckley, J. P., et al., "The sedentary office: an expert statement on the growing case for change towards better health and productivity," British Journal of Sports Medicine, vol. 49, Mar. 26, 2015, pp. 1357-1362.
Dalal, N., et al., "Histograms of Oriented Gradients for Human Detection," IEEE Computer Society Conference on Computer Vision and Pattern Recognition, Jun. 20-25, 2005, San Diego, California, USA, 8 pages.
Digeronimo, J., "EIC 2800 Search Report," Scientific and Technical Information Center, Mar. 14, 2018, 33 pages.
Girod, L., et al., "Locating Tiny Sensors in Time and Space: A Case Study," Proceedings of the 2002 IEEE International Conference on Computer Design: VLSI in Computers and Processors, Sep. 16-18, 2002, Freiberg, Germany, pp. 214-219.
Hnat, T., et al., "Doorjamb: Unobtrusive Room-level Tracking of People in Homes using Doorway Sensors," Proceedings of the 2012 Sensys: The ACM Conference on Embedded Networked Sensor Systems, Nov. 6-9, 2012, Toronto, Canada, 14 pages.

(56) References Cited

OTHER PUBLICATIONS

HELLA Aglaia, "APS-90 Advanced People Counting Sensor Data Sheet," HELLA Aglaia Mobile Vision GmbH, Available online at: <<http://people-sensing.com/wp-content/uploads/2017/08/2017_11_Factsheet_APS-90E_EN_web.pdf>>, Nov. 2017, 1 page.
Jia, J., et al., "Image Stitching Using Structure Deformation," IEEE Transactions on Pattern Analysis and Machine Intelligence, vol. 30, No. 4, Apr. 2008, pp. 617-631.
Kalman, R. E., "A New Approach to Linear Filtering and Prediction Problems," Transactions of the ASME—Journal of Basic Engineering, vol. 82, Series D, Jan. 1960, 12 pages.
Kamthe, A., et al., "Scopes: Smart Cameras Object Position Estimation System," Proceedings of the 2009 European Conference on Wireless Sensor Networks, IN: Roedig, U., et al. (eds.), Lecture Notes in Computer Science, vol. 5432, Springer, 2009, pp. 279-295.
Kulkarn I, P., et al., "Senseye: A multi-tier camera sensor network," Proceedings of the 2005 13th Annual ACM International Conference on Multimedia, Nov. 6-12, 2005, Singapore, Singapore, pp. 229-238.
Mathew, M., et al., "Sparse, Quantized, Full Frame CNN for Low Power Embedded Devices," 2017 IEEE Conference on Computer Vision and Pattern Recognition Workshops (CVPRW), Jul. 21-26, 2017, Honolulu, Hawaii, USA, 9 pages.
Patwari, N., et al., "Relative Location Estimation in Wireless Sensor Networks," IEEE Transactions on Signal Processing, vol. 51, No. 8, Aug. 2003, pp. 2137-2148.
Satpathy, A., et al., "Human Detection by Quadratic Classification on Subspace of Extended Histogram of Gradients," IEEE Transactions on Image Processing, vol. 23, No. 1, Jan. 2014, 11 pages.
Seoul Semiconductor, "STG0A2PD—Mid-Power LED—3528 Series Product Data Sheet," Seoul Semiconductor Co., Ltd., Revision 1.0, Available online at: <<http://www.seoulsemicon.com/upload2/3528_STGOA2PD_Spec_Rev1.0.pdf>>, Jul. 21, 2017, 19 pages.
Szeliski, R., "Image Alignment and Stitching: A Tutorial," Foundations and Trends in Computer Graphics and Vision, vol. 2, No. 1, 2006, pp. 1-104.
Zeng, C., et al., "Robust Head-shoulder Detection by PCA-Based Multilevel HOG-LBP Detector for People Counting," 2010 International Conference on Pattern Recognition, Aug. 23-26, 2010, Istanbul, Turkey, 4 pages.
Zhu, Q., et al., "Fast Human Detection Using a Cascade of Histograms of Oriented Gradients," IEEE Computer Society Conference on Computer Vision and Pattern Recognition, Jun. 17-22, 2005, New York, New York, USA, 8 pages.
Zomet, A., et al., "Seamless Image Stitching by Minimizing False Edges," IEEE Transactions on Image Processing, vol. 15, No. 4, Apr. 2006, pp. 969-977.
Non-Final Office Action for U.S. Appl. No. 15/192,308, dated Mar. 15, 2018, 10 pages.
Advisory Action for U.S. Appl. No. 15/192,308, dated Sep. 10, 2018, 3 pages.
Advisory Action for U.S. Appl. No. 15/192,035, dated Sep. 24, 2018, 3 pages.
Final Office Action for U.S. Appl. No. 15/849,986, dated Oct. 26, 2018, 7 pages.
International Preliminary Report on Patentability for International Patent Application No. PCT/US2017/016448, dated Aug. 23, 2018, 10 pages.
International Preliminary Report on Patentability for International Patent Application No. PCT/US2017/016454, dated Aug. 23, 2018, 10 pages.
International Preliminary Report on Patentability for International Patent Application No. PCT/US2017/016469, dated Aug. 23, 2018, 10 pages.
International Search Report and Written Opinion for International Patent Application No. PCT/US2018/037048, dated Aug. 31, 2018, 15 pages.
Notice of Allowance for U.S. Appl. No. 15/192,035, dated Nov. 6, 2018, 8 pages.
Notice of Allowance for U.S. Appl. No. 151972,176, dated Jun. 19, 2019, 8 pages.
Examination Report for European Patent Application No. 16735937.1, dated Apr. 11, 2019, 9 pages.
International Search Report and Written Opinion for International Patent Application No. PCT/US2019/016592, dated Apr. 17, 2019, 16 pages.
Office Action for German Patent Application No. 10 2018 213 656.4, dated May 22, 2019, 9 pages.
First Office Action for Chinese Patent Application No. 2016800474679, dated May 13, 2019, 26 pages.
Examination Report for European Patent Application No. 17705540.7, dated Jul. 26, 2019, 8 pages.
Examination Report for European Patent Application No. 17708904.2, dated Aug. 2, 2019, 9 pages.

* cited by examiner (DISPLAY)

(EDGE LIT)

(BACK LIT)

(SIDE LIT)

| ccx | ccy |
|---|---|
| 0.32 | 0.31 |
| 0.30 | 0.33 |
| 0.15 | 0.17 |
| 0.17 | 0.14 |
| 0.32 | 0.31 |

| ccx | ccy |
|---|---|
| 0.30 | 0.34 |
| 0.30 | 0.30 |
| 0.39 | 0.36 |
| 0.45 | 0.39 |
| 0.47 | 0.43 |
| 0.40 | 0.41 |
| 0.35 | 0.38 |
| 0.30 | 0.34 |

| ccx | ccy |
|---|---|
| 0.39 | 0.31 |
| 0.34 | 0.40 |
| 0.10 | 0.20 |
| 0.16 | 0.06 |
| 0.39 | 0.31 |

SKYLIGHT FIXTURE

This application is a continuation-in-part of U.S. patent application Ser. No. 15/419,538, filed Jan. 30, 2017; and claims the benefit of U.S. provisional patent application Ser. No. 62/628,131, filed Feb. 8, 2018, the disclosures of which are incorporated herein by reference in their entireties.

This application is related to U.S. patent application Ser. No. 15/972,176 filed May 6, 2018, entitled SKYLIGHT FIXTURE, the disclosure of which is incorporated herein by reference in its entirety.

FIELD OF THE DISCLOSURE

The present disclosure relates to lighting fixtures and in particular to lighting fixtures that emulate skylights.

BACKGROUND

A skylight is a window that is generally installed in a roof or ceiling. Skylights are excellent sources of natural light and highly desirable in many residential and commercial buildings. Providing natural light to an area is known to enhance moods, increase productivity, and improve ambiance among many other benefits. Skylights are often used to supplement the natural light in spaces with windows, and are often the only way to provide natural light to interior spaces that are not abutting exterior walls.

Unfortunately, providing skylights in many spaces is impractical or impossible. The lower floors of a building will not have direct access to the roof of the building. In many cases, even the top floor of the building will have structural or mechanical components that prevent the installation of skylights, limit the functionality of skylights, or would cause installation of the skylights to be too expensive.

Accordingly, there is a need to provide the benefits of skylights to those spaces where installation of skylights would be impractical or impossible.

SUMMARY

Disclosed is a lighting fixture that appears as a skylight and is referred to as a skylight fixture. The skylight fixture has a sky-resembling light assembly and a plurality of sun-resembling light assemblies. The sky-resembling light assembly has a specific optical assembly and a specific light source, wherein light from the light source exits a planar interior surface of the optical assembly as sky resembling light. The plurality of sun-resembling light assemblies are arranged adjacent one another and extend downward from a periphery of the sky-resembling light assembly. Each of the plurality of sun-resembling light assemblies has a specific optical assembly and a specific light source, wherein light from the light source exits a planar interior surface of the optical assembly as sun resembling light. The planar interior surfaces of the sky-resembling optical assembly and the plurality of sun-resembling optical assemblies define a cavity. One or more control modules alone or in a collective are configured to, in a first mode, drive the sky-specific light source and each sun-specific light sources such that the sky-resembling assembly has a light emission with a first color point and the at least one of the sun-resembling assemblies has light emission with a second color point that is different from the first color point. The skylight assembly may be configured to emulate a window of a traditional skylight. Each of the plurality of sunlight assemblies may be configured to emulate sunlight passing through and/or reflecting off of sidewalls of the traditional skylight. The interior surfaces need not be planar for either assembly for dome or other shaped skylight fixtures.

In one embodiment, one or both of the sky-specific light source and the sun-specific light source comprise first LEDs that emit light having a third color point, second LEDs that emit light having a fourth color point, and third LEDs that emit light having a fifth color point. In this embodiment or an independent embodiment, an interior angle formed between the planar interior surface of the sky-resembling optical assembly and the planar surface of each of the sun-resembling optical assembly is an obtuse angle. In various embodiments, the interior angle is greater than 90 degrees and less than or equal to 135 degrees; greater than or equal to 95 degrees and less than or equal to 130 degrees; or greater than or equal to 100 degrees and less than or equal to 125 degrees.

In one embodiment, the x coordinate value of the first color point and the x coordinate value of the second color point on the 1931 CIE Chromaticity Diagram differ by at least 0.1. The first color point falls within a first color space defined by x, y coordinates on the 1931 CIE Chromaticity Diagram: (0.37, 0.34), (0.35, 0.38), (0.15, 0.20), and (0.20, 0.14). The second color point falls within a second color space defined by x, y coordinates on the 1931 CIE Chromaticity Diagram: (0.29, 0.32), (0.32, 0.29), (0.41, 0.36), (0.48, 0.39), (0.48, 0.43), (0.40, 0.41), and (0.35, 0.38).

In one embodiment, the x coordinate value of the first color point and the x coordinate value of the second color point on the 1931 CIE Chromaticity Diagram differ by at least 0.1. The first color point falls within a first color space defined by x, y coordinates on the 1931 CIE Chromaticity Diagram: (0.32, 0.31), (0.30, 0.33), (0.15, 0.17), and (0.17, 0.14). The second color point falls within a second color space defined by x, y coordinates on the 1931 CIE Chromaticity Diagram: (0.30, 0.34), (0.30, 0.30), (0.39, 0.36), (0.45, 0.39), (0.47, 0.43), (0.40, 0.41), and (0.35, 0.38).

In one embodiment, the x coordinate value of the first color point and the x coordinate value of the second color point on the 1931 CIE Chromaticity Diagram differ by at least 0.1. The first color point falls within a first color space defined by x, y coordinates on the 1931 CIE Chromaticity Diagram: (0.39, 0.31), (0.34, 0.40), (0.10, 0.20), and (0.16, 0.06). The second color point falls within a second color space defined by x, y coordinates on the 1931 CIE Chromaticity Diagram: (0.28, 0.36), (0.35, 0.26), (0.44, 0.33), (0.62, 0.34), (0.50, 0.46), (0.43, 0.45), (0.36, 0.43).

In one embodiment, the x coordinate value of the first color point and the x coordinate value of the second color point on the 1931 CIE Chromaticity Diagram differ by at least 0.1. The first color point falls within a first color space defined by x, y coordinates on the 1931 CIE Chromaticity Diagram: (0.10, 0.20), (0.36, 0.43), (0.43, 0.45), (0.50, 0.46), (0.62, 0.34), (0.44, 0.33), (0.16, 0.06). The second color point falls within a second color space defined by x, y coordinates on the 1931 CIE Chromaticity Diagram: (0.10, 0.20), (0.36, 0.43), (0.43, 0.45), (0.50, 0.46), (0.62, 0.34), (0.44, 0.33), (0.16, 0.06).

In one embodiment, the x coordinate value of the first color point and the x coordinate value of the second color point on the 1931 CIE Chromaticity Diagram differ by at least 0.15. In another embodiment, the x coordinate value of the first color point and the x coordinate value of the second color point on the 1931 CIE Chromaticity Diagram differ by at least 0.2.

In one embodiment, the x coordinate value of the first color point is less than the x coordinate value of the second color point on the 1931 CIE Chromaticity Diagram. In another embodiment, the y coordinate value of the first color point is less than the y coordinate value of the second color point on the 1931 CIE Chromaticity Diagram. In yet another embodiment, both the x coordinate value of the first color point is less than the x coordinate value of the second color point on the 1931 CIE Chromaticity Diagram and they coordinate value of the first color point is less than the y coordinate value of the second color point on the 1931 CIE Chromaticity Diagram. The x coordinate value of the first color point and the x coordinate value of the second color point on the 1931 CIE Chromaticity Diagram may differ by at least 0.15, 0.2, and 0.25.

In one embodiment, the sky-specific light source comprises first LEDs that emit light having a third color point, second LEDs that emit light having a fourth color point, and third LEDs that emit light having a fifth color point. The third color point, the fourth color point, and the fifth color point are spaced apart from one another on the 1931 CIE Chromaticity Diagram by at least 0.05 in at least one of x and y directions. The first LEDs may emit white light, and the third color point may be within three, five, seven, or ten MacAdams Ellipses of a blackbody curve. The second LEDs may emit bluish light, the third LEDs may emit greenish light, and the y coordinate value of the fourth color point and the y coordinate value of the fifth color point on the 1931 CIE Chromaticity Diagram may differ by at least 0.1, 0.15, or 0.2.

In one embodiment, at least two of the sun-specific light sources may have fourth LEDs that emit light having a sixth color point, fifth LEDs that emit light having a seventh color point, and sixth LEDs that emit light having an eighth color point. The sixth color point, the seventh color point, and the eighth color point may be spaced apart from one another on the 1931 CIE Chromaticity Diagram by at least 0.05, 0.1, or 0.15 in at least one of x and y directions.

In one embodiment, at least two of the sun-specific light sources have first LEDs that emit light having a third color point, second LEDs that emit light having a fourth color point, and third LEDs that emit light having a fifth color point. The third color point, the fourth color point, and the fifth color point spaced may be apart from one another on the 1931 CIE Chromaticity Diagram by at least 0.05, 0.1, or 0.15 in at least one of x and y directions.

In one embodiment, the sky-resembling light assembly and the sun-resembling light assembly may provide a composite light output that has a color rendering index of greater than 90.

In one embodiment, the one or more control modules may be further configured to independently and variably drive the sky-specific light source and each sun-specific source such that the first color point and the second color point are independently variable.

In one embodiment, the one or more control modules may be further configured to drive the sky-specific light source and each sun-specific light source such that the first color point and the second color point change temporally.

In one embodiment, the one or more control modules may be further configured to drive the sky-specific light source and each sun-specific light source such that the first color point and the second color point are selected based on a time of day.

In one embodiment, the one or more control modules may be further configured to drive the sky-specific light source and each sun-specific light source such that the first color point and the second color point are selected based on information received from a remote device.

In one embodiment, the one or more control modules may be further configured to drive the sky-specific light source and each sun-specific light source such that the first color point and the second color point are selected based on sensor information provided by at least one sensor.

In one embodiment, the one or more control modules may be further configured to drive the sky-specific light source and each sun-specific light source such that the first color point and the second color point are selected based on outdoor lighting conditions.

In one embodiment, the one or more control modules may be further configured to drive the sky-specific light source and each sun-specific light source such that the first color point and the second color point are selected based on outdoor weather conditions.

In one embodiment, the one or more control modules may be further configured to drive the sky-specific light source and each sun-specific light source such that the first color point and the second color point are selected based on outdoor environmental conditions.

In one embodiment, the one or more control modules may be further configured to, in a second mode, drive the sky-specific light source and each sun-specific light source to change the first and second color point to provide a circadian stimulus.

In one embodiment, the one or more control modules may be further configured to, in a second mode, drive each sunlight light source to change the second color point of the sunlight light provided by each sunlight source to have additional red spectral content.

In one embodiment, the one or more control modules may be further configured to communicate with other skylight fixtures and drive the sky-specific light source and each sun-specific light source such that the sky-specific emission and sun-specific emission is coordinated with that from the other skylight fixtures.

While the above features of various embodiments are listed separately for clarity, each of the features above may be implemented together in any combination as long as functionality is not destroyed.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 2A:
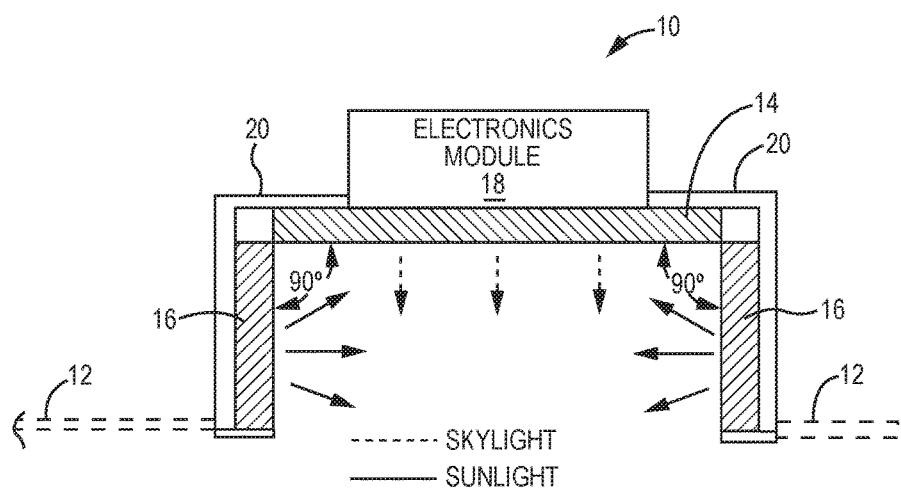
FIG. 2A is a cross-section of a skylight fixture according to a first embodiment.
Figure 2B:
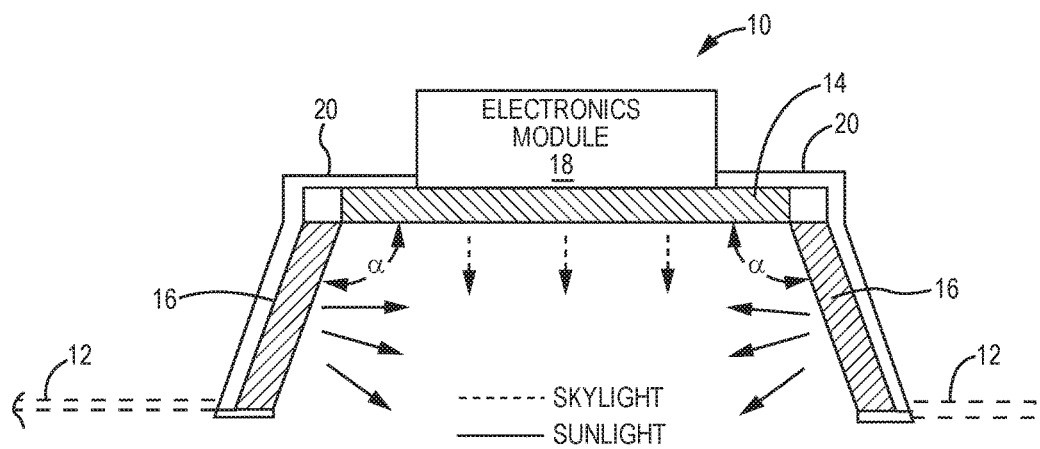

FIG. 2B as a cross-section of a skylight fixture according to a second embodiment.

Figure 3:
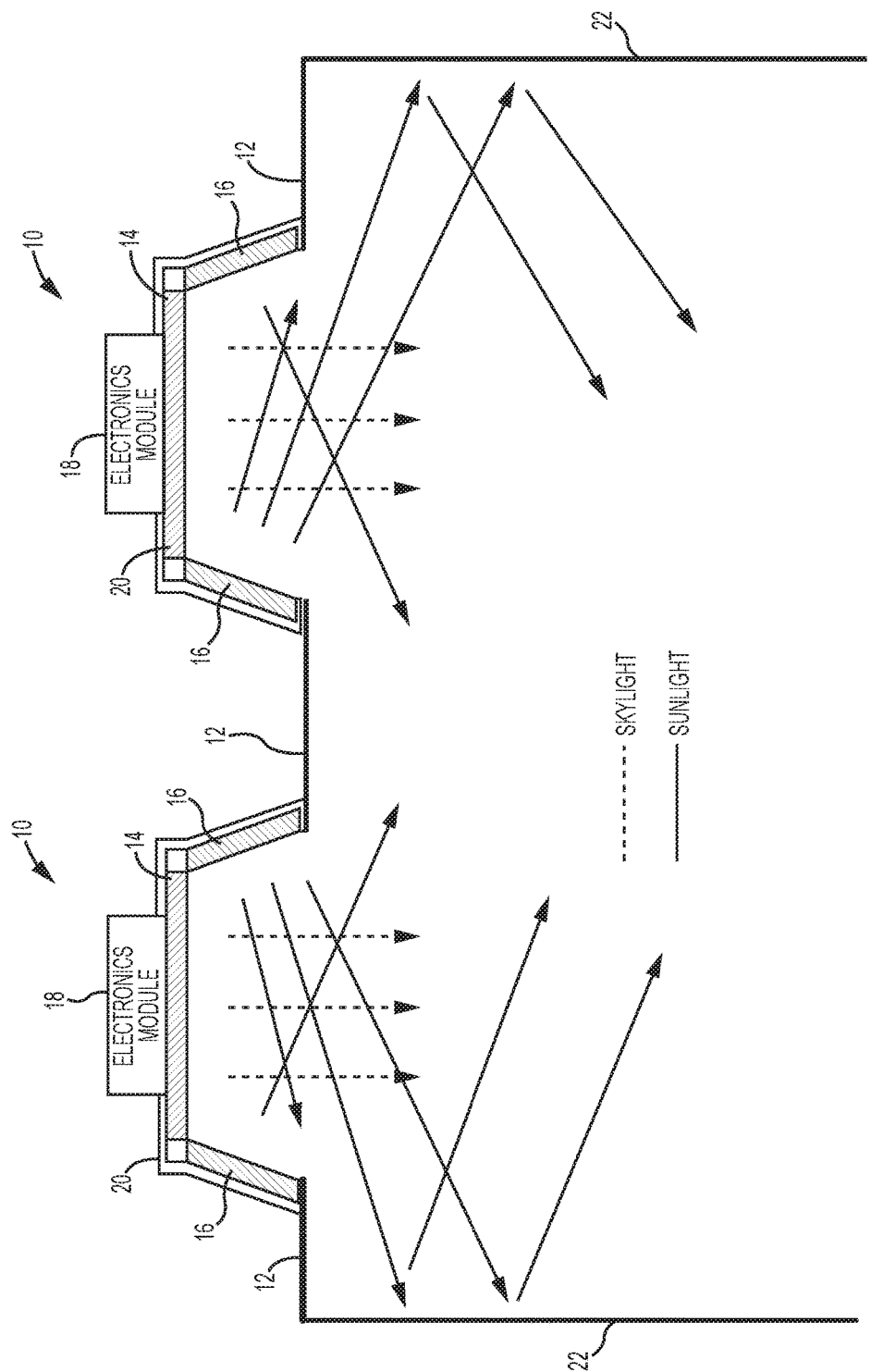

FIG. 3 illustrates multiple skylight fixtures mounted in a ceiling in a room.

Figure 4:
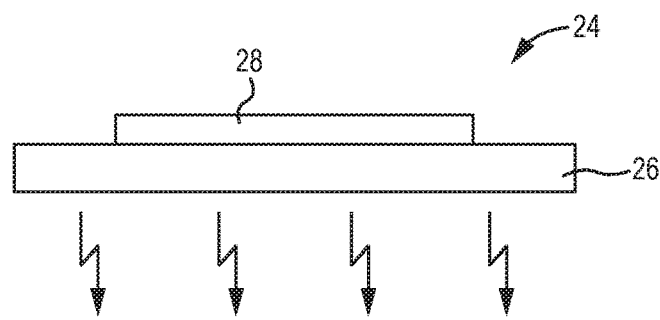

FIG. 4 illustrates a display, which can be used as either a sky-resembling assembly or a sun-resembling assembly of a skylight fixture.

Figure 5:
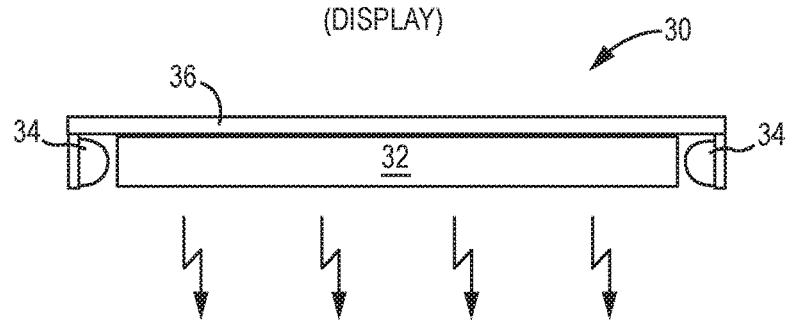

FIG. 5 illustrates a first light engine embodiment, which can be used as either a sky-resembling assembly or a sun-resembling assembly of a skylight fixture.

Figure 6:
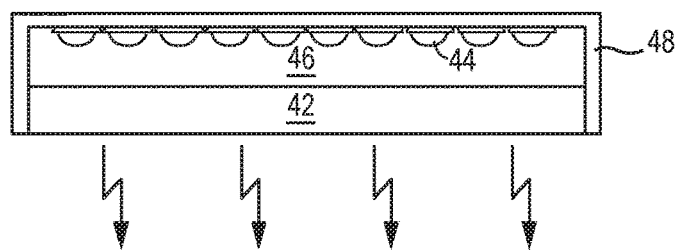

FIG. 6 illustrates a second light engine embodiment, which can be used as either a sky-resembling assembly or a sun-resembling assembly of a skylight fixture.

Figure 7:
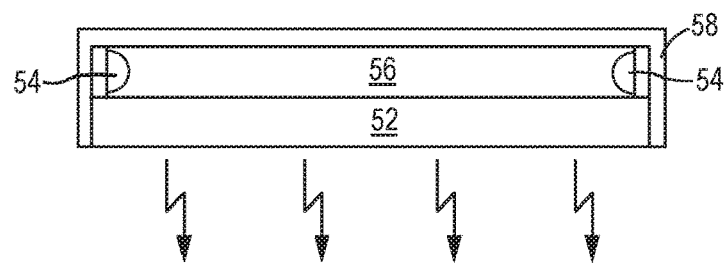

FIG. 7 illustrates a third light engine embodiment, which can be used as either a sky-resembling assembly or a sun-resembling assembly of a skylight fixture.

Figure 8:
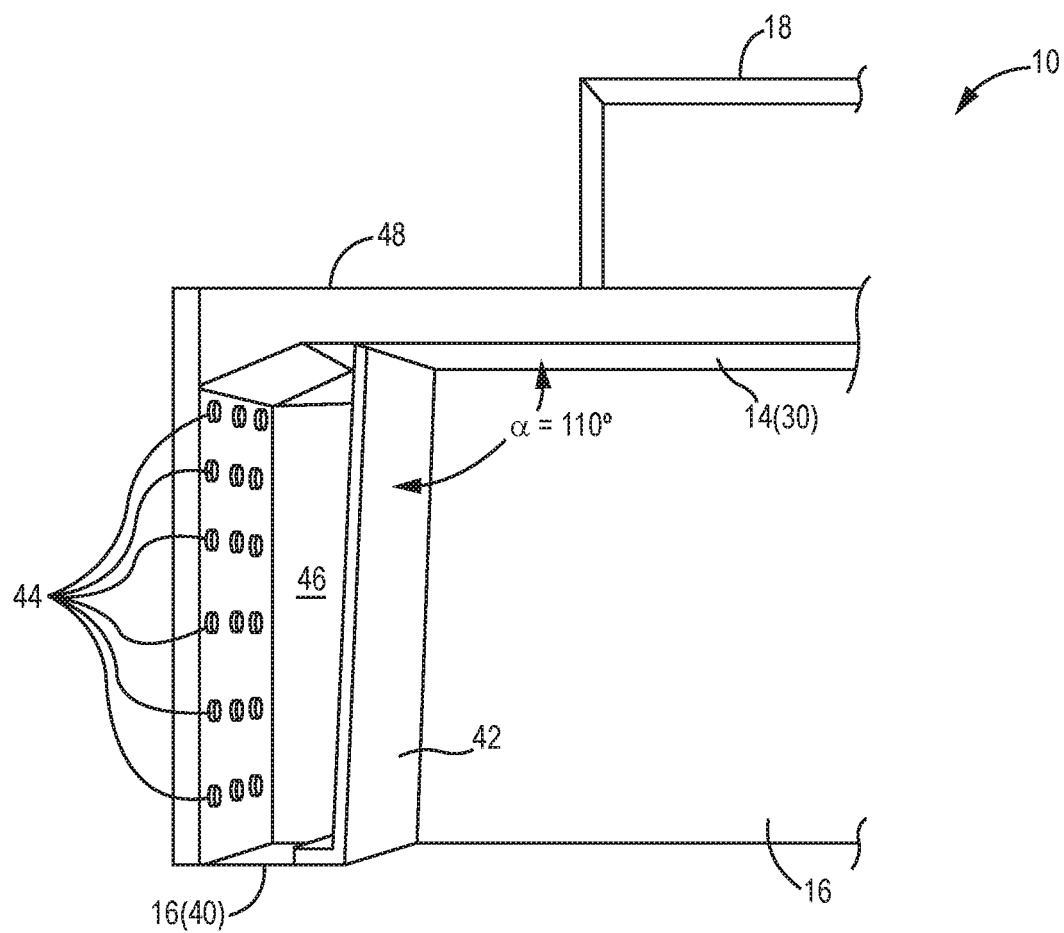

FIG. 8 is a partial cross-section of a skylight fixture according to a third embodiment.

Figure 9:
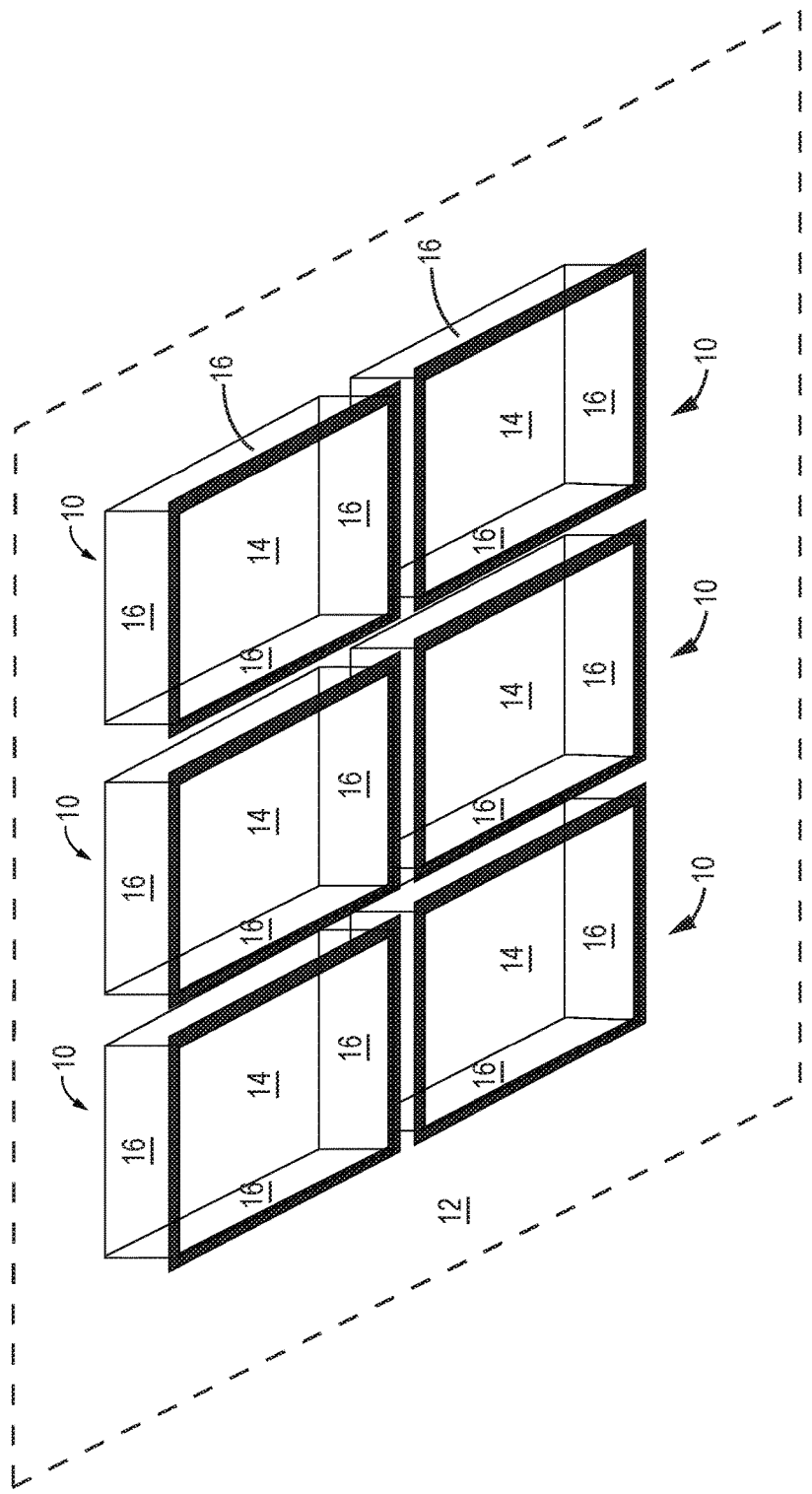

FIG. 9 illustrate multiple skylight fixtures arranged in an array in a ceiling.

Figures 10A, 10B:
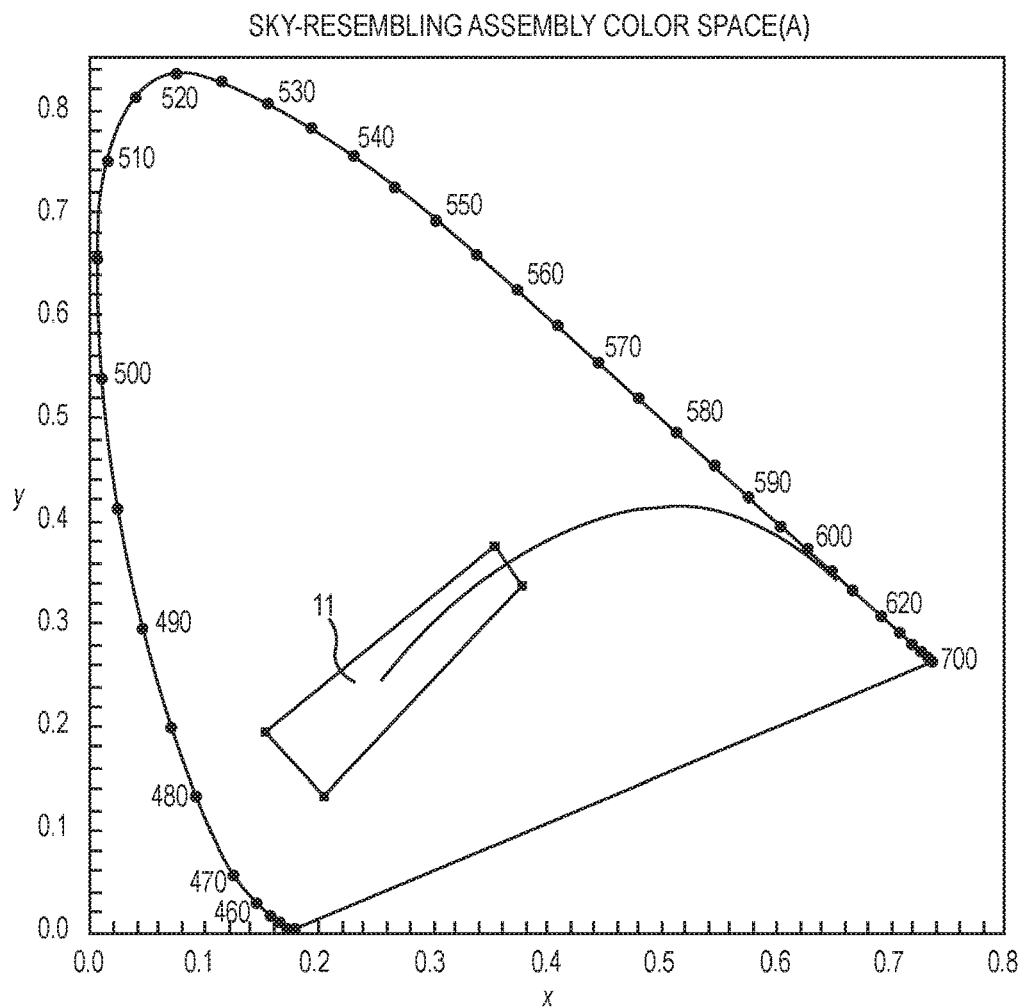

FIG. 10A is a 1931 CIE Chromaticity Diagram on which a color space for a first embodiment of a sky-resembling assembly is provided.

FIG. 10B is a table of coordinates that define the color space illustrated in FIG. 10A.

Figures 11A, 11B:
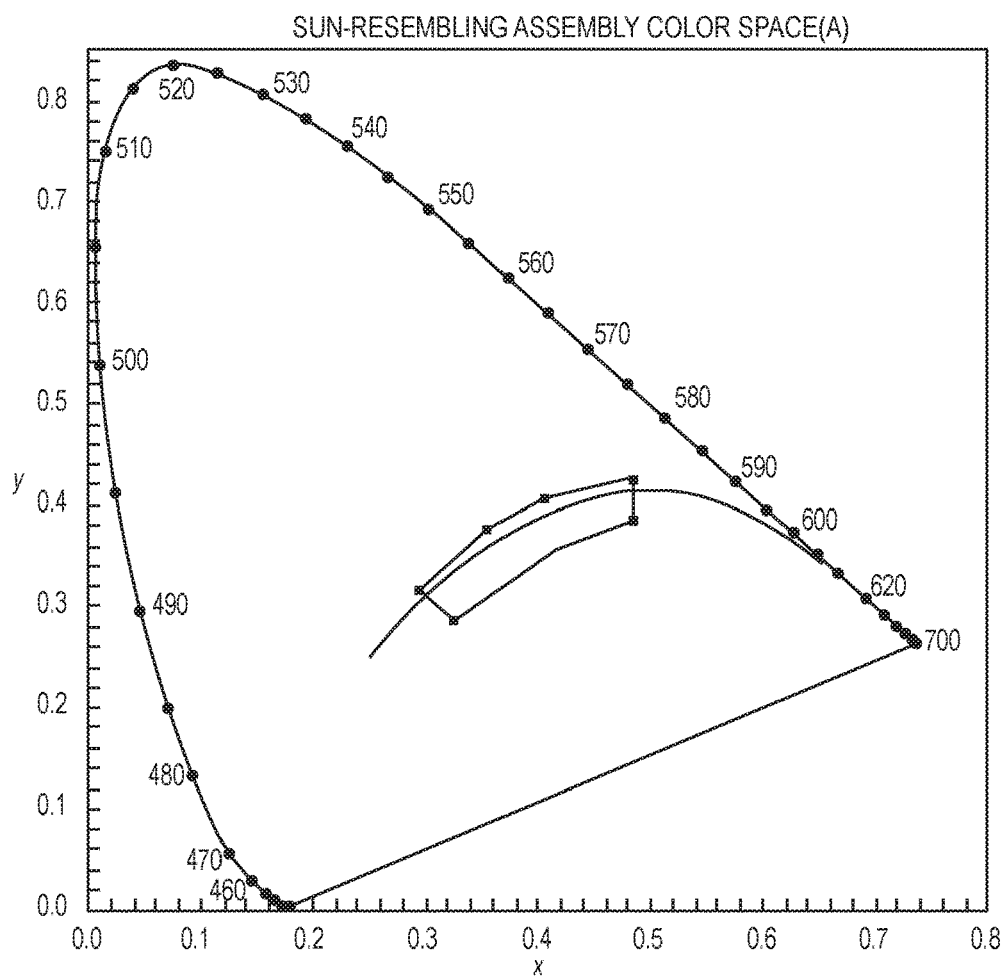

FIG. 11A is a 1931 CIE Chromaticity Diagram on which a color space for a first embodiment of a sun-resembling assembly is provided.

FIG. 11B is a table of coordinates that define the color space illustrated in FIG. 11A.

Figures 12A, 12B:
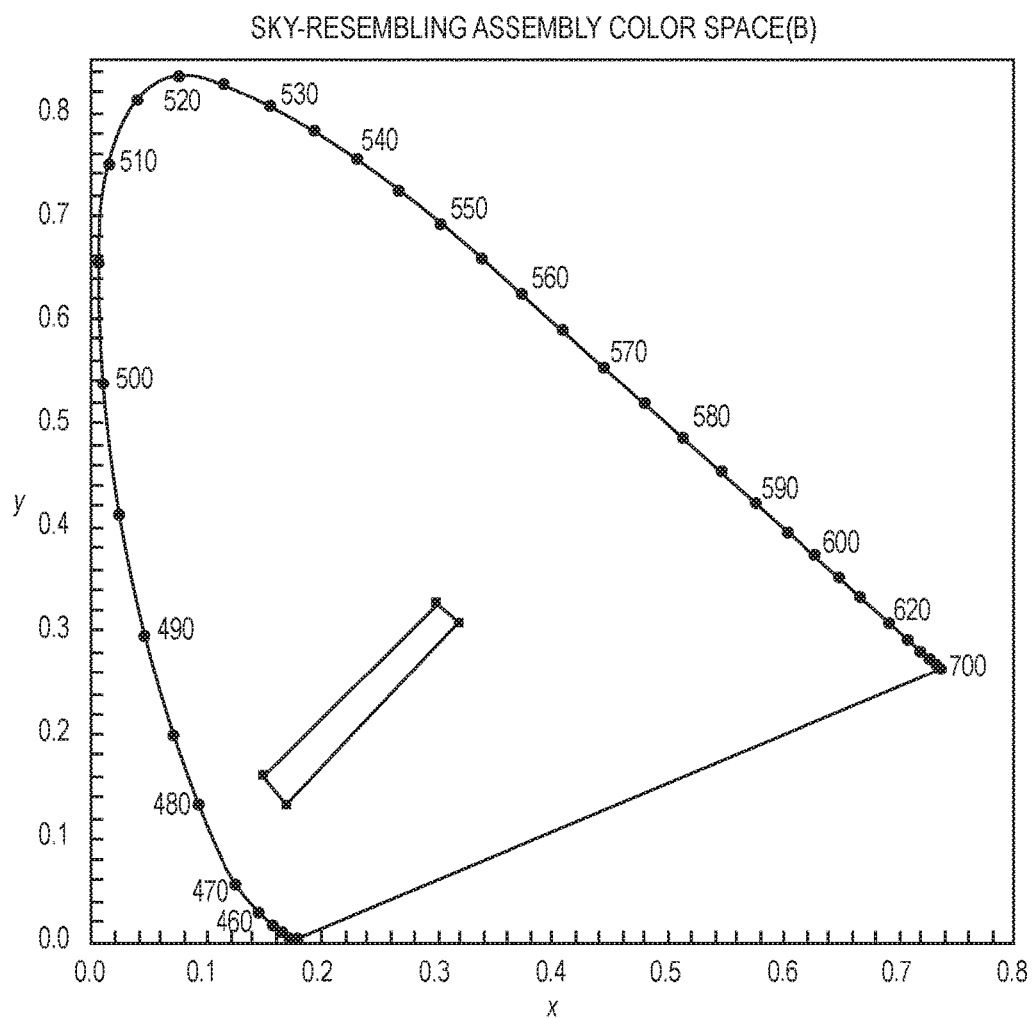

FIG. 12A is a 1931 CIE Chromaticity Diagram on which a color space for a second embodiment of a sky-resembling assembly is provided.

FIG. 12B is a table of coordinates that define the color space illustrated in FIG. 12A.

Figures 13A, 13B:
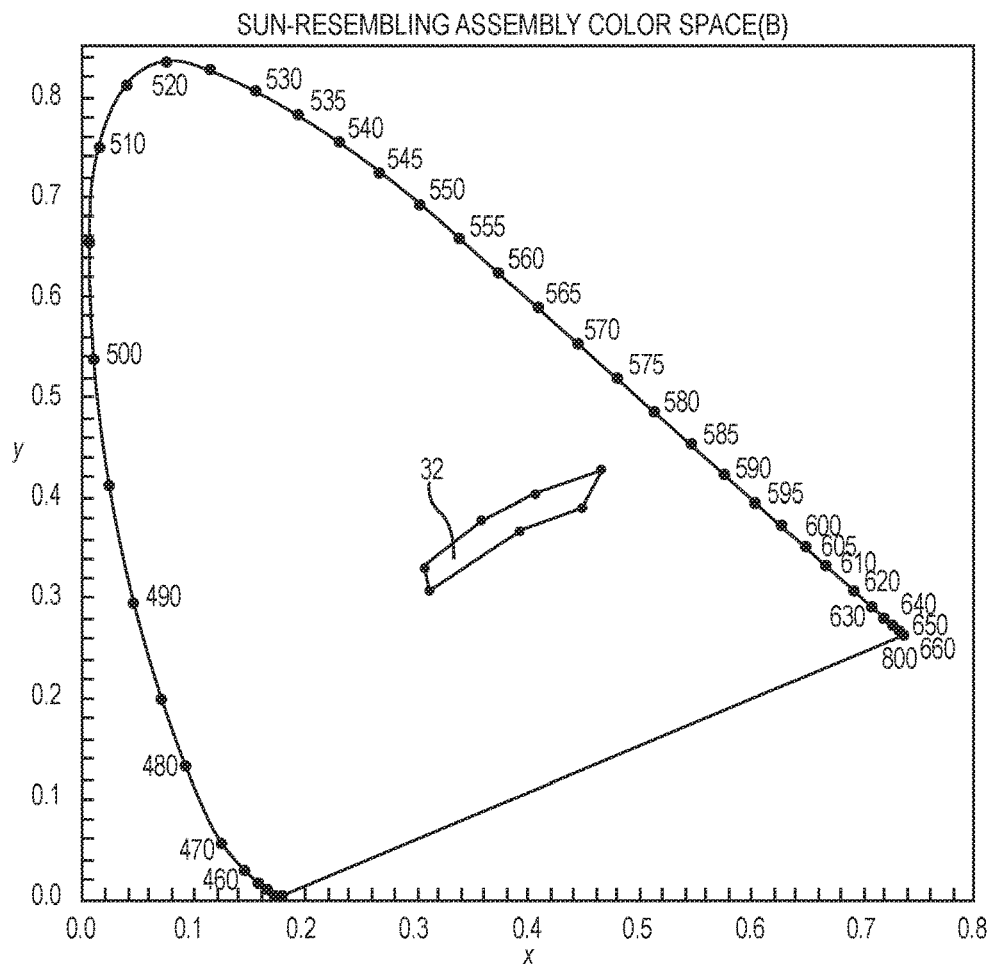

FIG. 13A is a 1931 CIE Chromaticity Diagram on which a color space for a second embodiment of a sun-resembling assembly is provided.

FIG. 13B is a table of coordinates that define the color space illustrated in FIG. 13A.

Figures 14A, 14B:
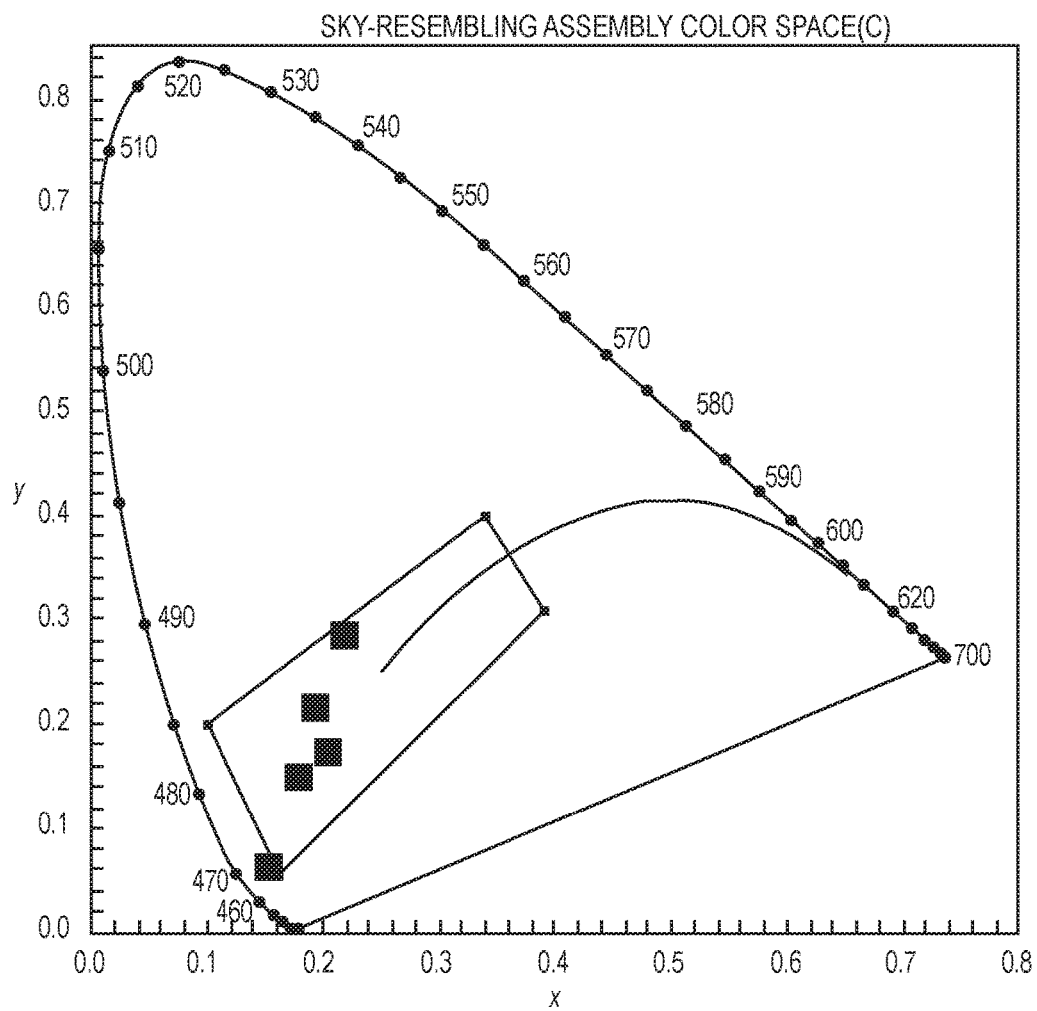

FIG. 14A is a 1931 CIE Chromaticity Diagram on which a color space for a third embodiment of a sky-resembling assembly is provided.

FIG. 14B is a table of coordinates that define the color space illustrated in FIG. 14A.

Figures 15A, 15B:
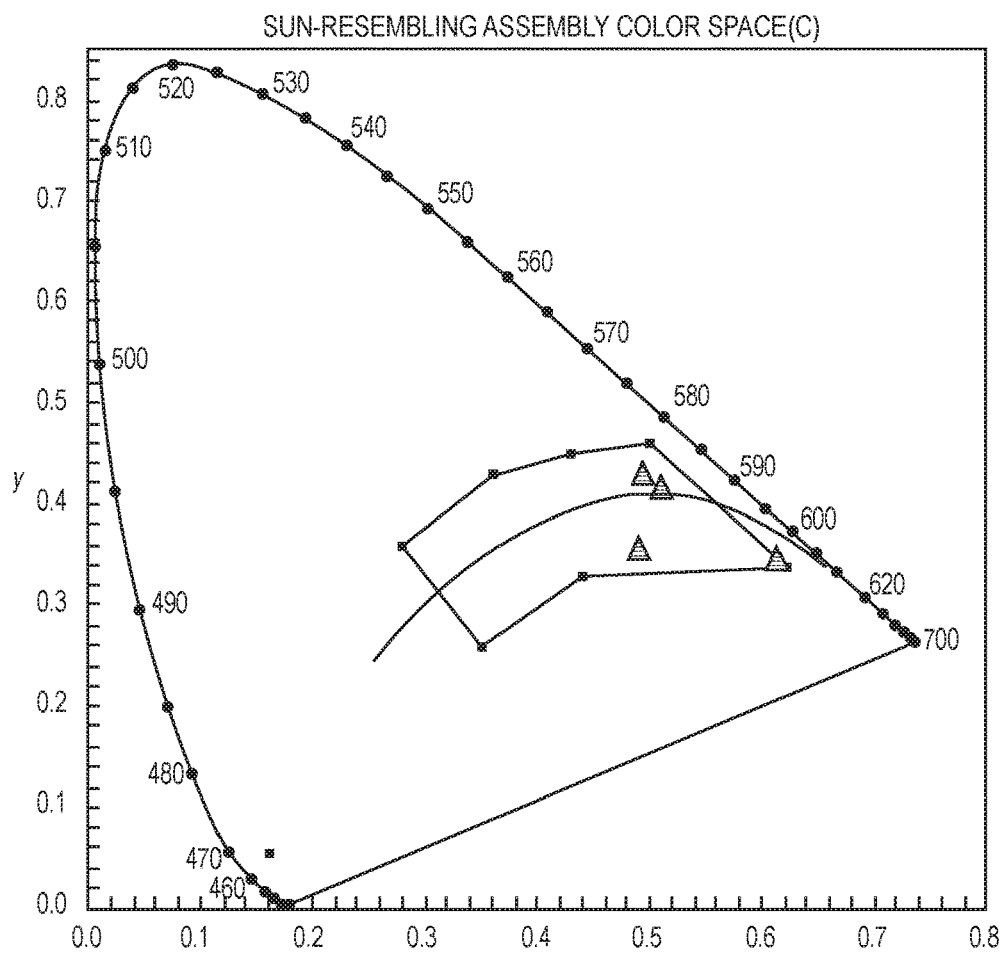

FIG. 15A is a 1931 CIE Chromaticity Diagram on which a color space for a third embodiment of a sun-resembling assembly is provided.

FIG. 15B is a table of coordinates that define the color space illustrated in FIG. 15A.

Figures 16A, 16B:
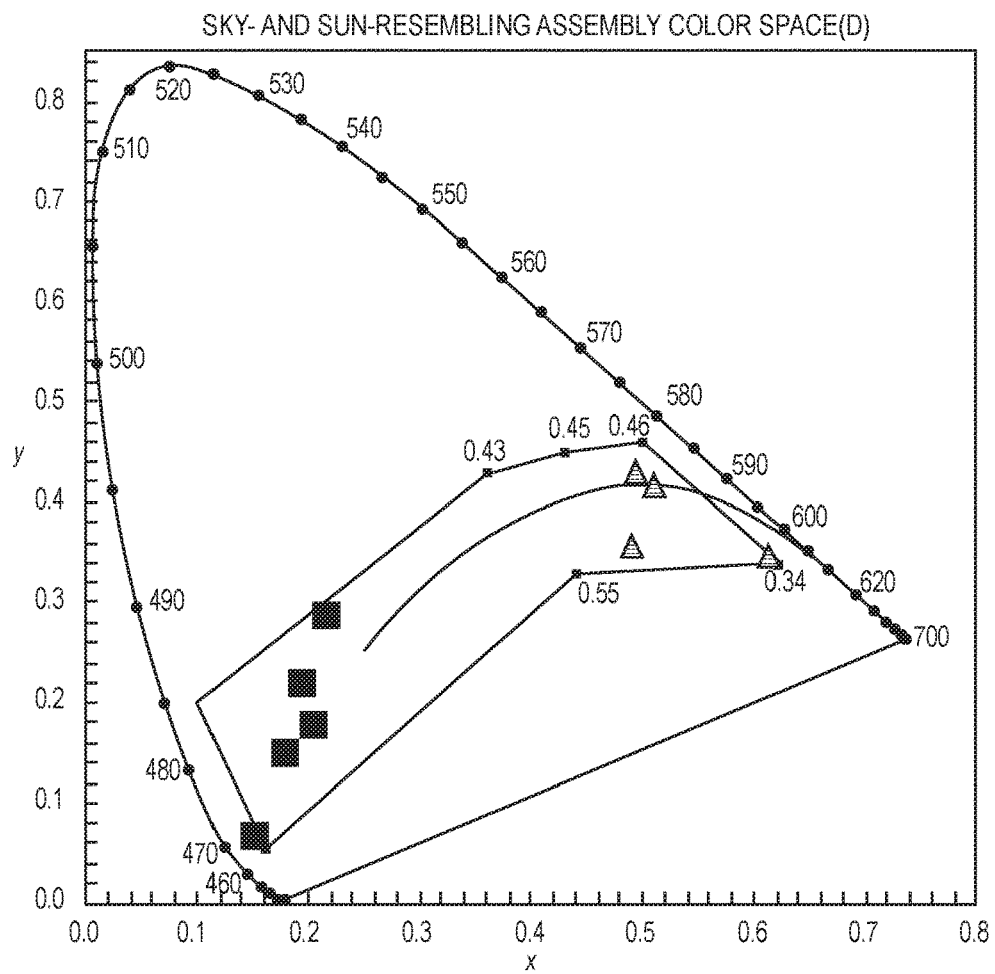

FIG. 16A is a 1931 CIE Chromaticity Diagram on which a color space for a fourth embodiment of both sky-resembling and sun-resembling assembly is provided.

FIG. 16B is a table of coordinates that define the color space illustrated in FIG. 16A.

Figure 17:
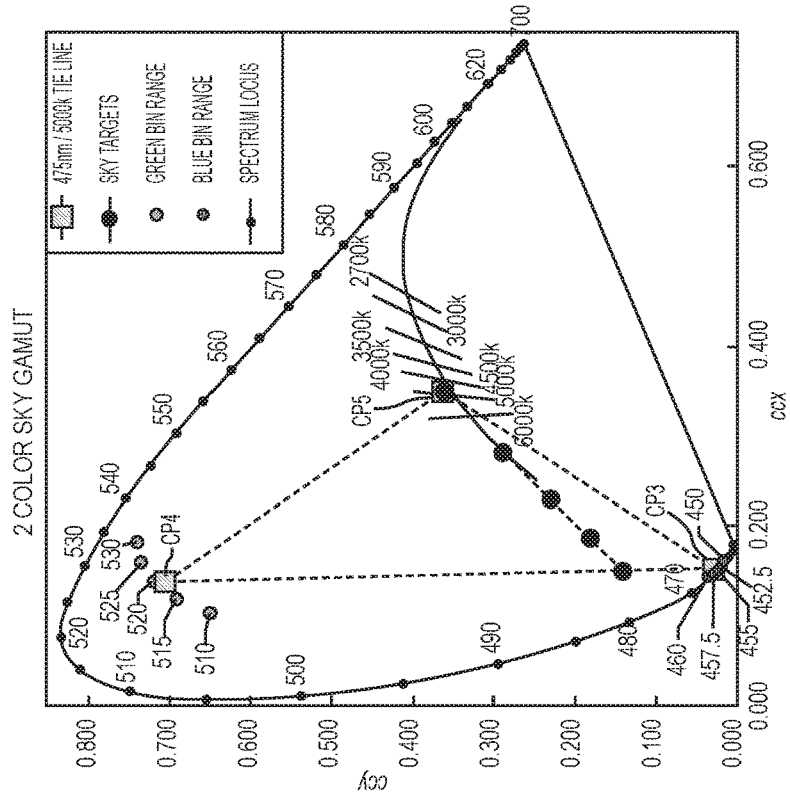

FIG. 17 is a 1931 CIE Chromaticity Diagram on which a color gamut for a sky-resembling assembly that employs two different colors of LEDs is provided according to a first embodiment.

Figure 18:
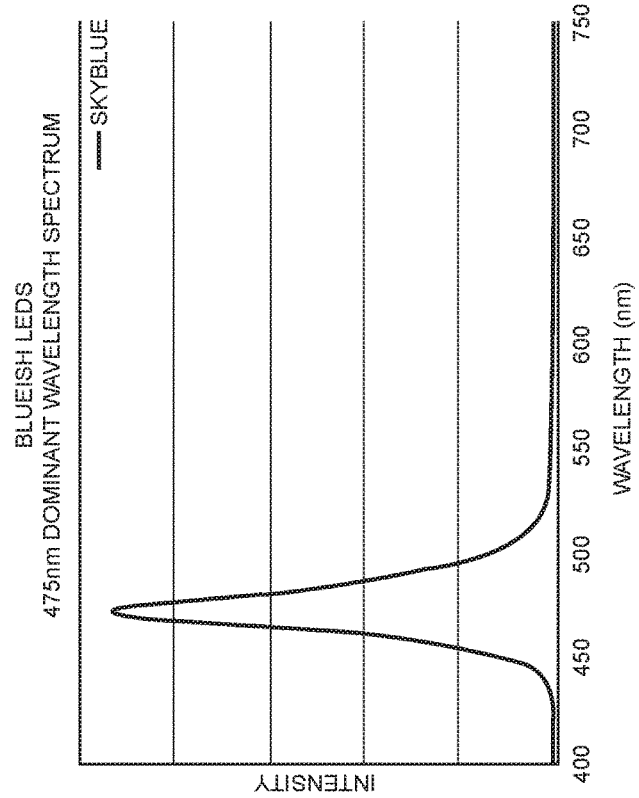

FIG. 18 is a graph of the emission spectrum for a bluish LED for the embodiment of FIG. 17.

Figure 19:
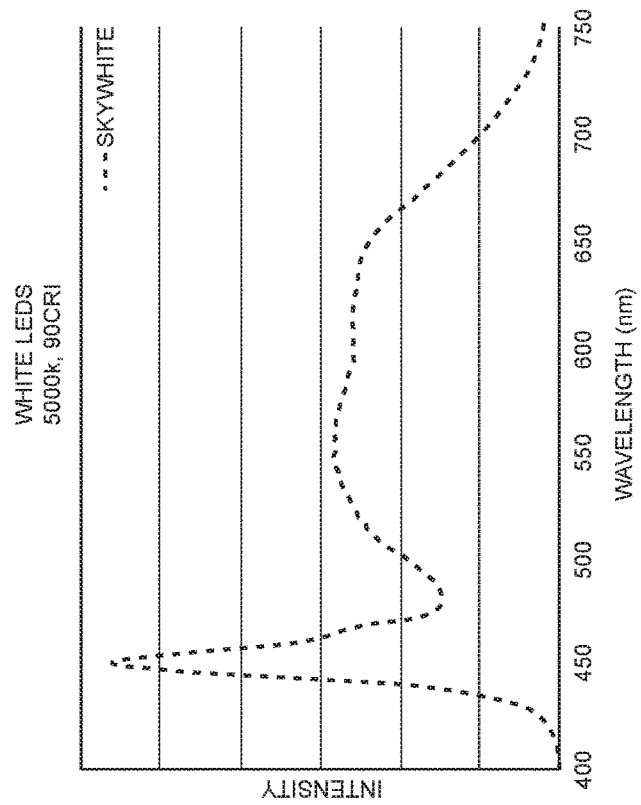

FIG. 19 is a graph of the emission spectrum for a white LED for the embodiment of FIG. 17.

Figure 20:
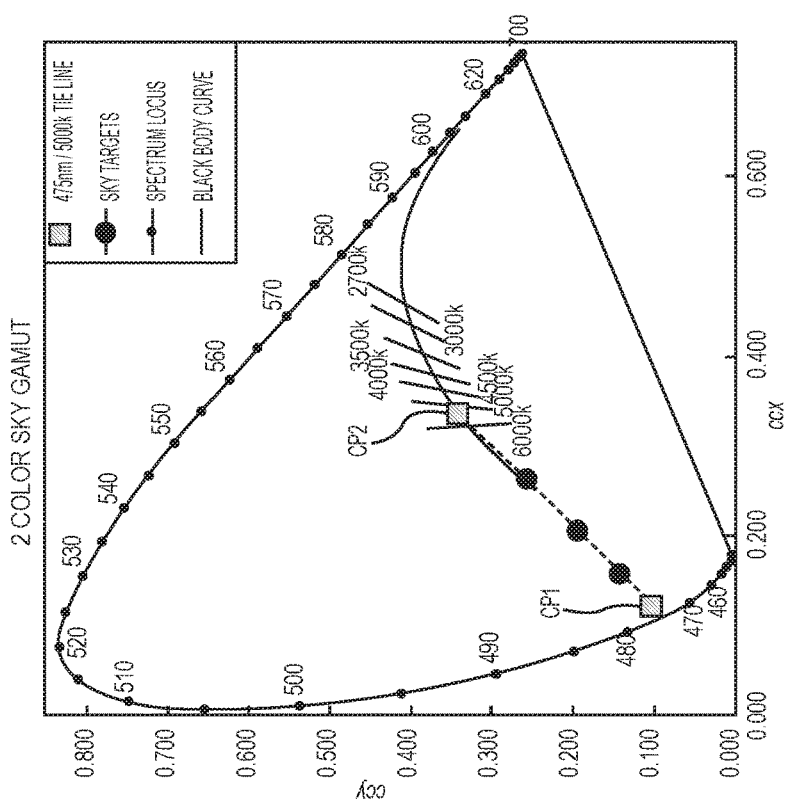

FIG. 20 is a 1931 CIE Chromaticity Diagram on which a color gamut for a sky-resembling assembly that employs three different colors of LEDs is provided according to a second embodiment.

Figure 21:
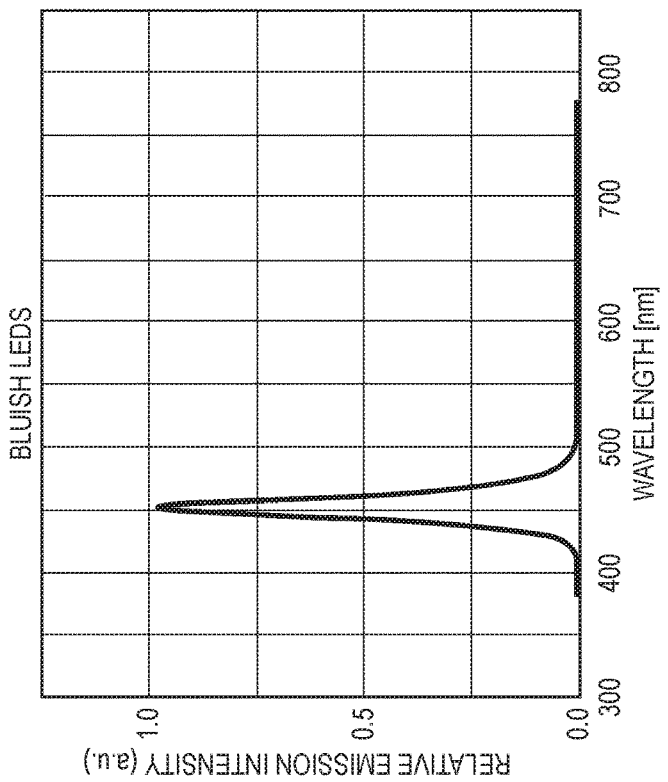

FIG. 21 is a graph of the emission spectrum for a bluish LED for the embodiment of FIG. 20.

Figure 22:
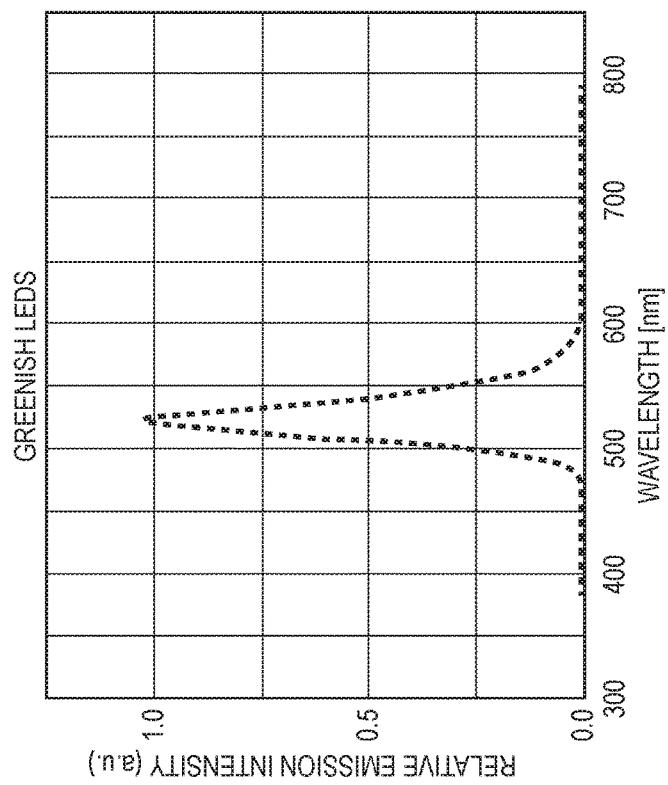

FIG. 22 is a graph of the emission spectrum for a greenish LED for the embodiment of FIG. 20.

Figure 23:
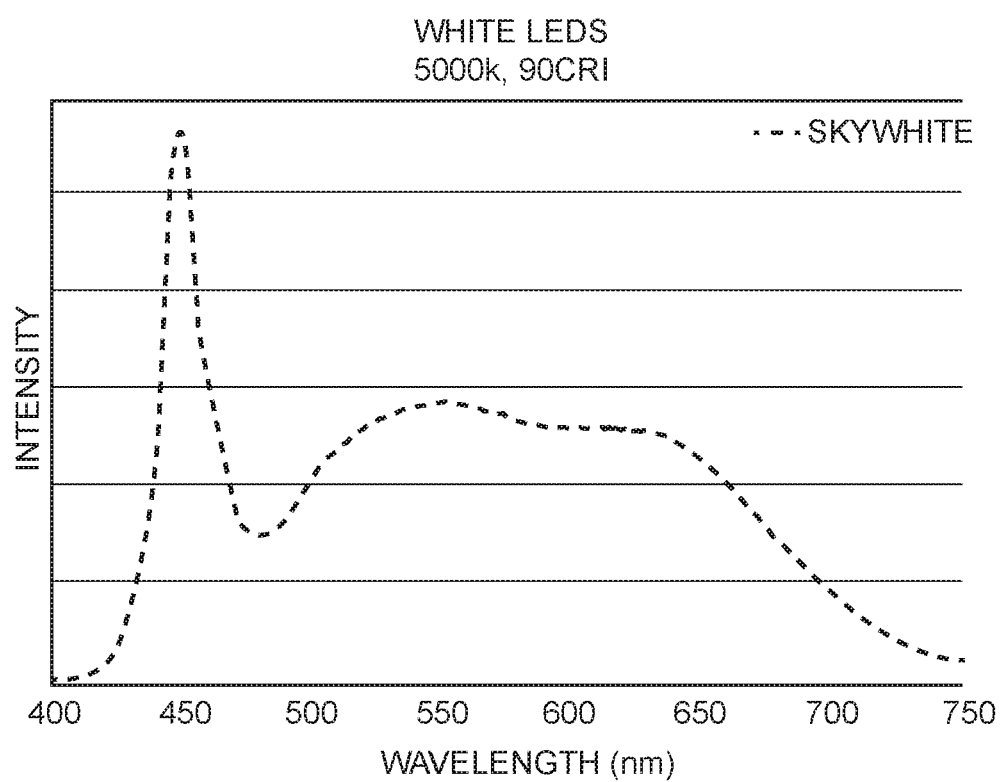

FIG. 23 is a graph of the emission spectrum for a white LED for the embodiment of FIG. 20.

Figure 24:
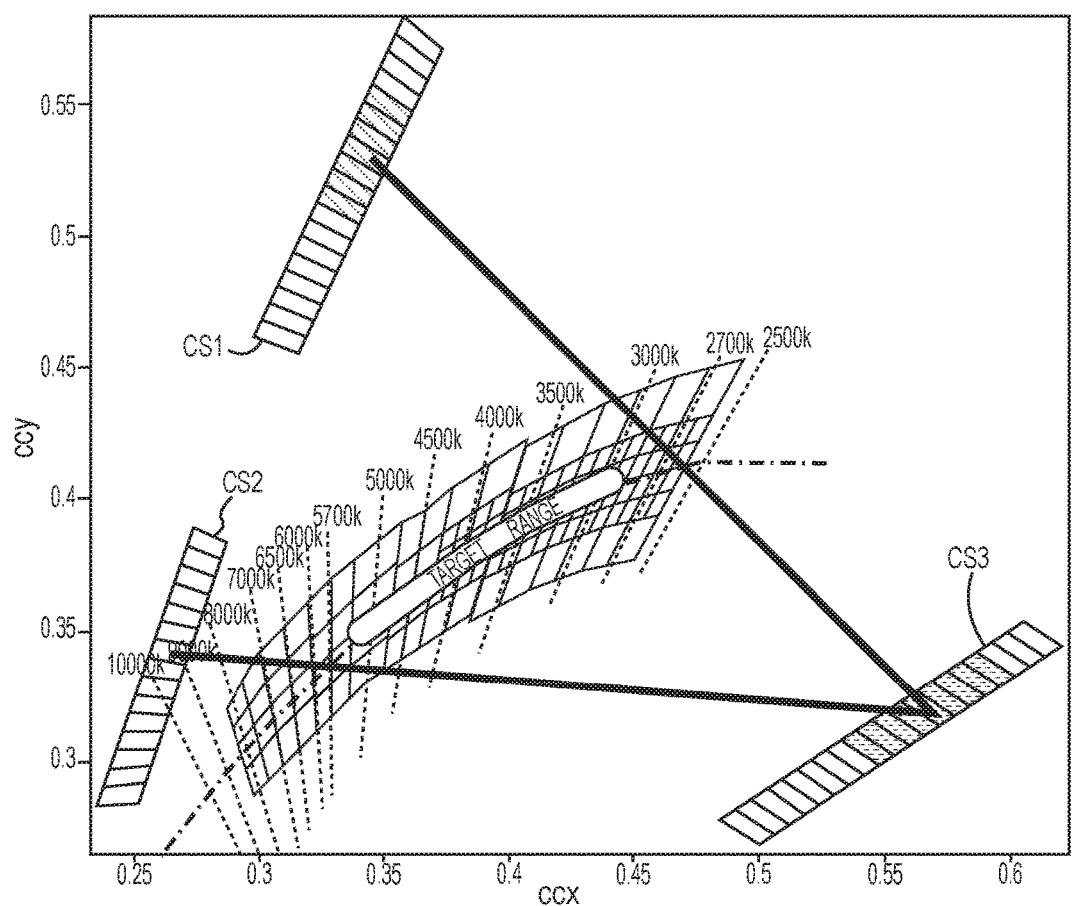

FIG. 24 is a 1931 CIE Chromaticity Diagram on which a color gamut for a sun-resembling assembly that employs three different colors of LEDs is provided according to a one embodiment.

Figure 25:
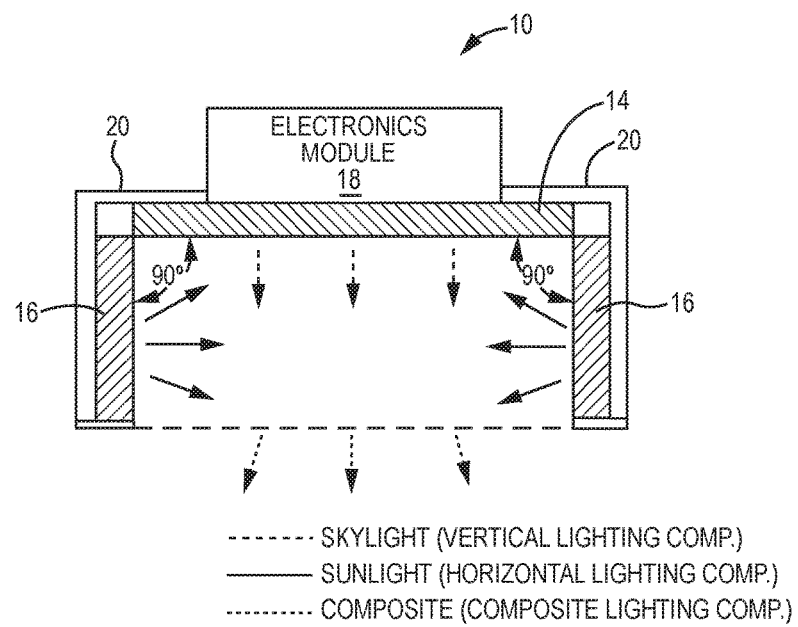

FIG. 25 is a cross-section of a skylight fixture according to a first embodiment and illustrates the various lighting components of the skylight fixture.

Figure 26:
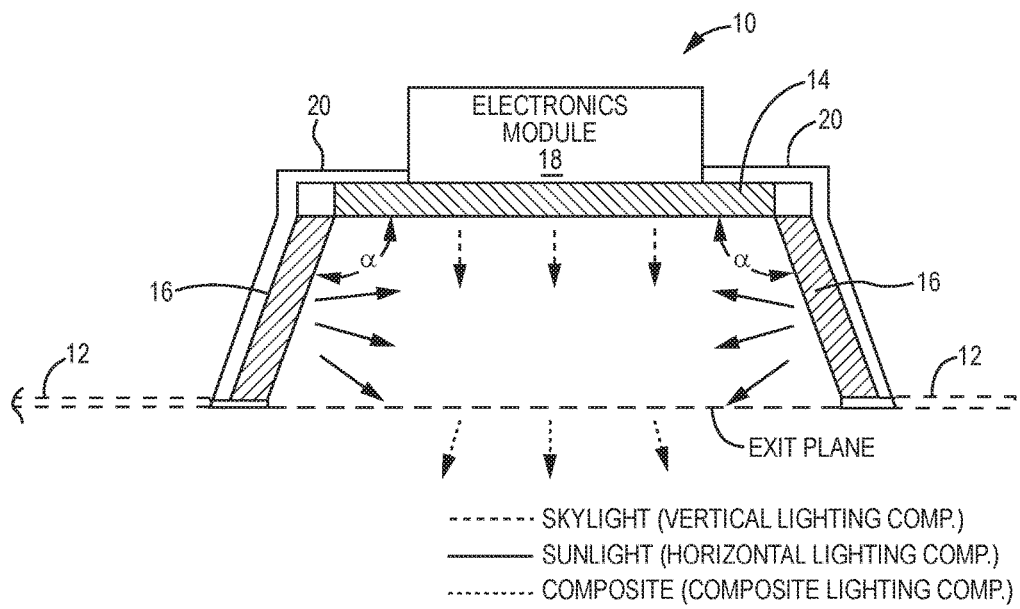

FIG. 26 as a cross-section of a skylight fixture according to a second embodiment and illustrates the various lighting components of the skylight fixture.

Figure 27:
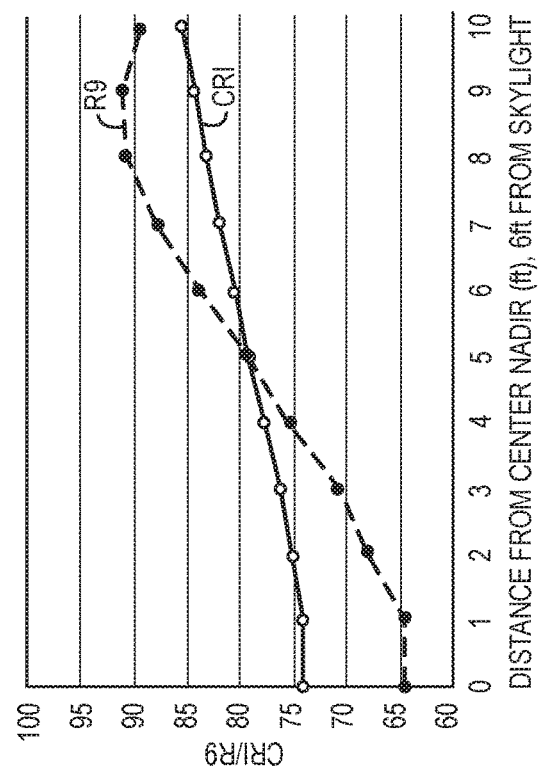

FIG. 27 is a graph of CRI and R9 versus distance from center nadir for an exemplary skylight fixture with sky- and sun-resembling assemblies that employ two different colors of LEDs.

Figure 28:
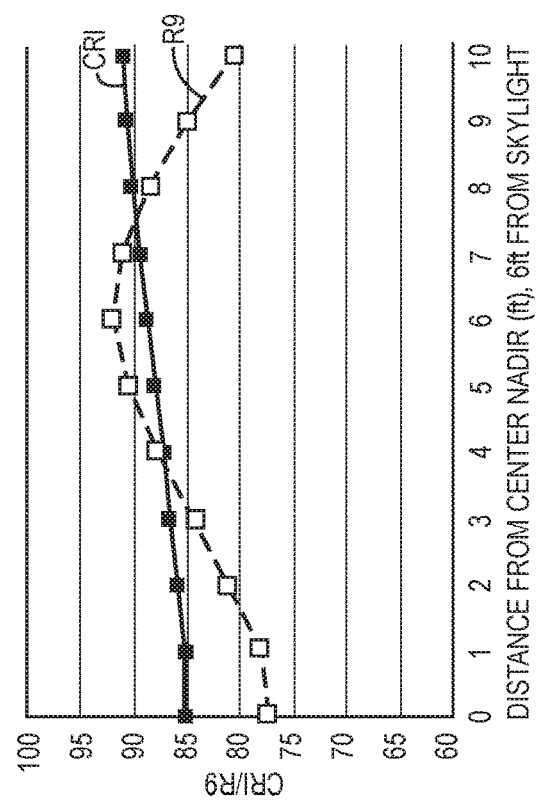

FIG. 28 is a graph of CRI and R9 versus distance from center nadir for an exemplary skylight fixture with sky- and sun-resembling assemblies that employ three different colors of LEDs.

Figure 29:
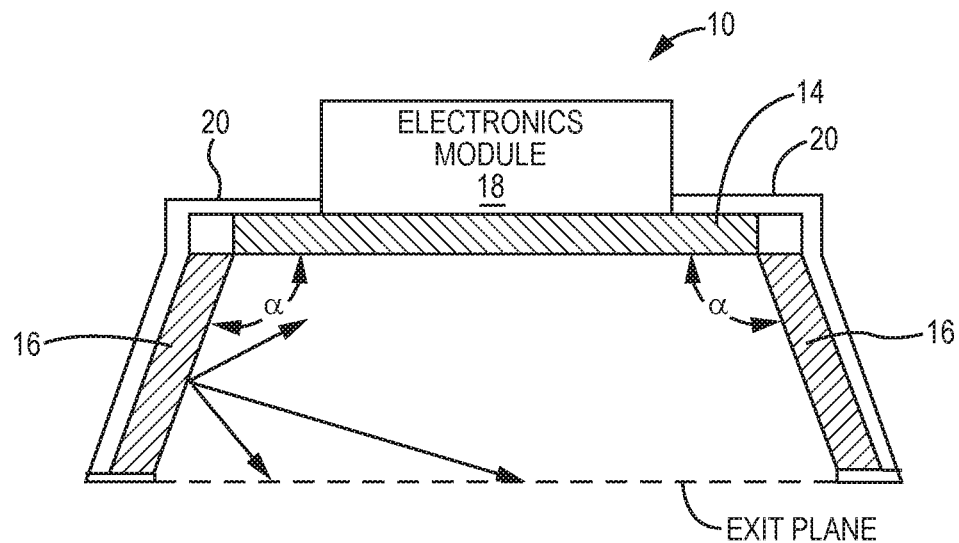

FIG. 29 is a cross-section of a skylight fixture according to a first embodiment and illustrates redirection of light emitted from the sun-resembling assemblies toward an exit pane of the skylight fixture.

Figure 30:
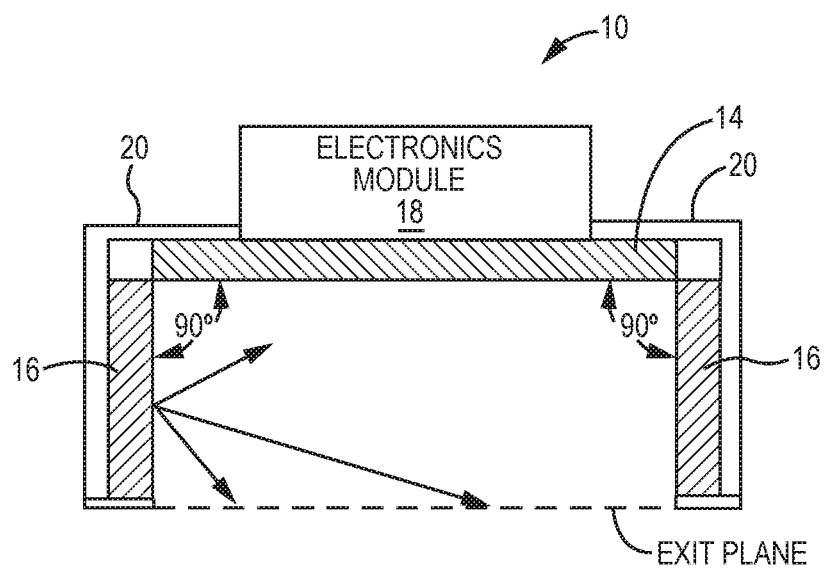

FIG. 30 as a cross-section of a skylight fixture according to a second embodiment and illustrates redirection of light emitted from the sun-resembling assemblies toward an exit pane of the skylight fixture.

Figure 31:
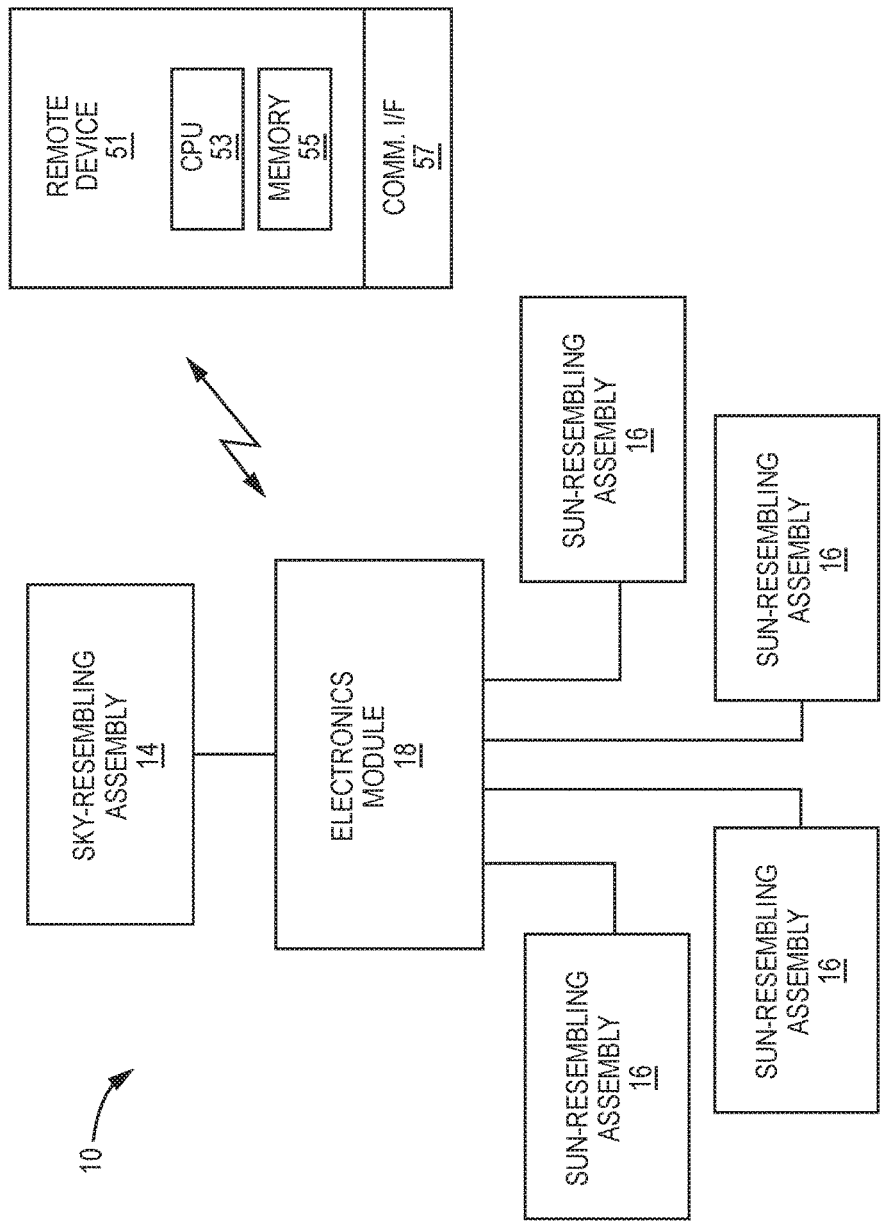

FIG. 31 is a block diagram of a skylight fixture in communication with a remote device according to one embodiment of the disclosure.

Figure 32:
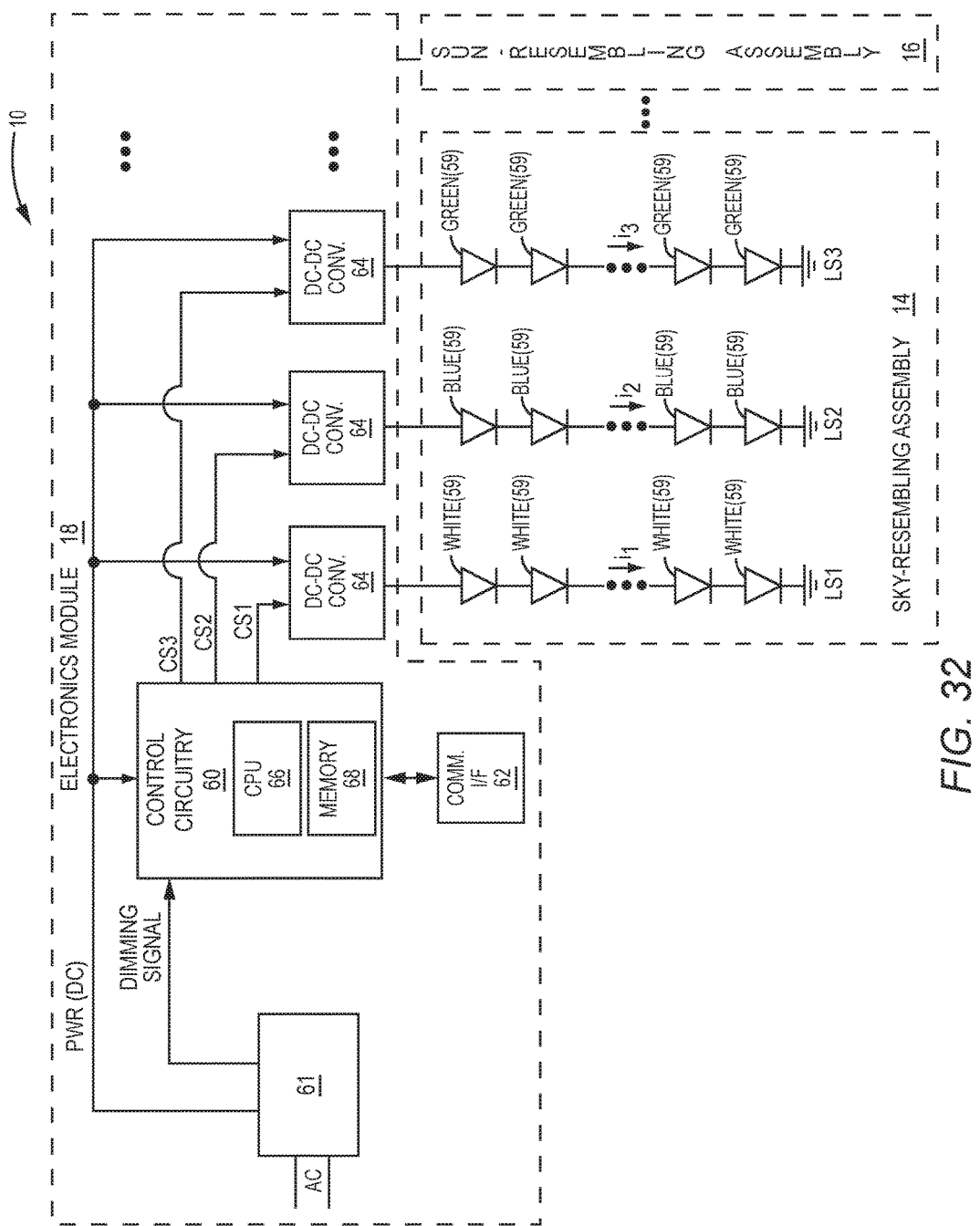

FIG. 32 is a schematic diagram of an exemplary electronics module and associated sky- and sun-resembling assemblies according to one embodiment.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Disclosed is a lighting fixture that appears as a skylight and is referred to as a skylight fixture. The skylight fixture has a sky-resembling assembly and a plurality of sun-resembling assemblies. The sky-resembling assembly has a sky-resembling optical assembly and a sky-specific light source, wherein light from the sky-specific light source exits a planar interior surface of the skylight optical assembly as skylight light. The plurality of sun-resembling assemblies are arranged adjacent one another and extend downward from a periphery of the sky-resembling assembly. Each of the plurality of sun-resembling assemblies has a sun-resembling optical assembly and a sun-specific light source, wherein light from the sun-specific light source exits a planar interior surface of the sunlight optical assembly as sunlight light. The planar interior surfaces of the skylight optical assembly and the plurality of sunlight optical assemblies define a cavity. It is understood that the planar surfaces of the various optical assemblies could have other shapes like curved or circular, such as in a dome shaped lighting fixture or the like. One or more control modules alone or in a collective are configured to, in a first mode, drive the sky-specific light source and each sun-specific light source such that the sky-specific light emission has a first color point and the sun-specific light emission of at least one of the plurality of sun-resembling assemblies has a second color point that is different from the first color point. The sky-resembling assembly may be configured to emulate a window of a traditional skylight. Each of the plurality of sun-resembling assemblies may be configured to emulate sunlight passing through and/or reflecting off of sidewalls of a traditional skylight.

Figure 1:
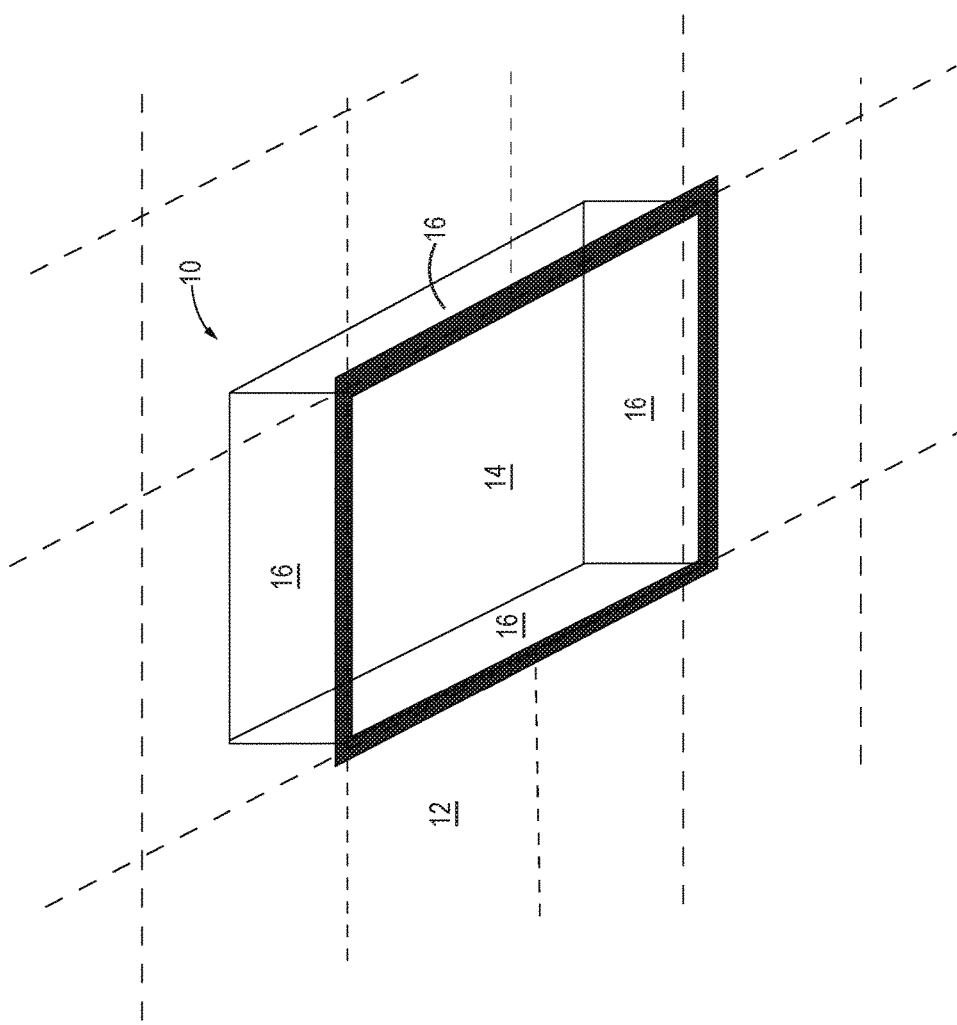
FIG. 1 illustrates a skylight fixture mounted in a ceiling according to one embodiment.

An exemplary skylight fixture 10 is illustrated in FIG. 1. The skylight fixture 10 is mounted in a ceiling structure 12, which in the illustrated embodiment is a drop ceiling, such as that used in many commercial buildings. However, those skilled in the art will recognize that the skylight fixture 10 may be installed in any type of ceiling structure 12, such as drywall, wood, masonry, and the like. In essence, the skylight fixture 10 has the general appearance of and emulates a traditional skylight. The skylight fixture 10 takes the general shape of an inverted box that has multiple sidewalls and a bottom wall. For purposes that will become clearer below, the bottom wall is referred to as a sky-resembling assembly 14, and the sidewalls are referred to as sun-resembling assemblies 16. The sky-resembling and sun-resembling assemblies 14, 16 are formed from light engines, the details of which are described further below.

In general, the sky-resembling assembly 14 is configured to emit light and provide the appearance of the sky to a viewer. In essence, the sky-resembling assembly 14 emulates the window portion of a traditional skylight. The sun-resembling assemblies 16 are configured to emulate the sidewalls of a traditional skylight. Generally, the sidewalls of a traditional skylight reflect the more directional sunlight emanating from the sun. For the concepts described herein, the sun-resembling assemblies 16 are configured to emulate sunlight coming through the skylight directly at a particular angle or being reflected off of a sidewall. Accordingly, the sky-resembling assembly 14 is configured to provide the generally non-directional light associated with the sky, whereas the sun-resembling assembly 16 emulates the direct sunlight or a reflection thereof from the sun. Depending on the time of day or night, the intensity, color temperature, color of light emitted from the sky-resembling and sun-resembling assemblies 14, 16 will vary in an effort to emulate the light provided by a traditional skylight at different times of the day or night and any transitions therebetween.

FIGS. 2A and 2B provide cross-sectional views of two different embodiments of the skylight fixture 10. In the embodiment of FIG. 2A, the sun-resembling assemblies 16 are essentially orthogonal to the sky-resembling assembly 14. Opposing sun-resembling assemblies 16 are effectively parallel with one another. In other words, the exposed surfaces of the sun-resembling assembly 16 form a 90 degree angle with the exposed surface of the sky-resembling assembly 14.

For the embodiment of FIG. 2B, the exposed surfaces of the sun-resembling assembly 16 form an obtuse angle a with the exposed surface of the sky-resembling assembly 14. As described further below, increasing the angle between the exposed surfaces of the sun-resembling assemblies 16 and the sky-resembling assembly 14 may improve emulation of sunlight passing through the skylight fixture 10. While there is no specific limitation on the value of the obtuse angle $\alpha$, experiments have shown particularly effective performance when the obtuse angle $\alpha$ is:

90 degrees<$\alpha$≤135;
95 degrees≤$\alpha$≤130; or
100 degrees≤$\alpha$≤125.

Also illustrated in FIGS. 2A and 2B are an electronics module 18 and a general housing 20. The electronics module 18 provides the requisite electronics for the skylight fixture 10. The electronics module 18 may include power supply electronics, control electronics, communication electronics, and/or the requisite driver circuitry for the sky-resembling and sun-resembling assemblies 14, 16. In FIGS. 2A and 2B and select figures to follow, dashed line arrows represent the "sunlight" emanating from the sky-resembling assembly 14, and the solid line arrows represent the "sunlight" emanating directly from or being reflected from the sunlight assembly 16.

FIG. 3 illustrates two skylight fixtures 10 mounted in a ceiling structure 12 in a room with walls 22. While light may not be completely controlled, FIG. 3 illustrates "sunlight" from the sky-resembling assembly 14 projecting predominantly downward into the room, wherein the "sunlight" (solid line arrows) from the sun-resembling assemblies 16 is projected into the room in a more angular fashion, such that the light emanated from the sun-resembling assemblies 16 illuminates and reflects off of the walls 22 in an effort to emulate sunlight coming through a traditional skylight at an angle and directly lighting up the walls 22 or being reflected off of a sidewall of a traditional lighting fixture and being reflected into the room at an angle.

As indicated above, both the sky-resembling and sun-resembling assemblies 14, 16 may be provided by various types of light engines. The sky-resembling and sun-resembling assemblies 14, 16 in a particular skylight fixture 10 may incorporate the same or different types of light engines. If the same light engines are used for both the sky-resembling and sun-resembling assemblies 14, 16, these light engines may be configured the same or differently depending on the spectral capabilities of the light engines.

FIGS. 4-7 illustrate four different types of light engines. The illustrated light engines are provided merely as examples, and do not represent an exclusive or exhaustive list. With reference to FIG. 4, the first type of illustrated light engine may take the form of a display device, such as a light emitting diode (LED) display, a liquid crystal display (LCD), an organic LED (OLED) display, or the like. A typical display assembly 24 will include a display panel 26 on which images are displayed, and appropriate driver electronics 28 to drive the display panel 26. Based on the input of the driver electronics 28, the display panel 26 will display images in the desired manner.

The display assembly 24 is particularly beneficial as a sky-resembling assembly 14 due to the tremendous flexibility in scenes that can be displayed in an effort to emulate the appearance of the sky during any time of the day or night. The display can simply provide a uniform color across the display to emulate the blue sky of day, the sunset in the evening, or the black at night. In more sophisticated embodiments, the display can vary to indicate clouds, stars scattered in the night sky, the reddish orange light illuminating clouds during a sunrise or sunset, and the like. In essence, incorporation of a display assembly 24 provides the flexibility of presenting anything from a specifically colored panel to specific still or moving images, which may be coordinated among multiple skylight fixtures 10.

The embodiments of FIGS. 5, 6, and 7 will generally not be capable of displaying particular images, but may project light of a varying intensity, color, and color temperature while appearing a particular color and brightness. Notably, the light emanating from one of these light engines may be different from a color of the panel the light engine actually appears. For example, one may want the light engine to appear blue, but project white light. In these embodiments, the light projected from the light engines and the appearance of the light engines will be substantially uniform.

With particular reference to FIG. 5, an edge lit-type light engine is provided, wherein an optical assembly 32 is edge lit with one or more light sources 34. In particular, the optical assembly 32 may be a single or multi-layer optical waveguide, diffuser, lens, or any combination thereof. The light sources 34, which are illustrated as LEDs but are not limited thereto, illuminate the edges of the optical assembly 32, and light is emitted from a front surface of the optical assembly 32. Typically, the light source 34 will extend along all of at least one side of the optical assembly 32, if not multiple or all sides of the optical assembly 32. The light engine 30 will include a light engine housing 36 to maintain the optical assembly 32 and the light source 34 in a proper orientation with respect to one another, as well as to allow the overall light engine 30 to be mounted in the skylight fixture 10. Notably, the LEDs of the light source 34 may be the same or different colors, depending on the application. If LEDs of different colors are provided, the optical assembly 32 will facilitate the mixing of light from the various LEDs, such that light emanates from the front surface of the optical assembly 32 in a uniform manner.

Turning now to FIG. 6, a back lit-type light engine 40 is illustrated. An optical assembly 42 that has a front side and an opposing back side is provided. A light source 44, such as an array of LEDs, is positioned to illuminate the back surface of the optical assembly 42, such that light emitting from the light source 44 passes through the optical assembly 42 and emanates from the front surface of the optical assembly 42. Typically, the LEDs of the LED array of the light source 44 are spaced apart from the back surface of the optical assembly 42, wherein a mixing chamber 46 is provided between the light source and the back surface of the optical assembly 42. This allows LEDs of different colors of light to be used in the light source 44. The different colors of light will mix in the mixing chamber and be passed through the optical assembly 42, which may provide further mixing and diffusion, depending on the particular application. As with the above embodiments, a light engine housing 48 may be provided to hold the optical assembly 42 and the light source 44 in a proper orientation to one another and allow mounting to the skylight fixture 10.

FIG. 7 illustrates a side lit-type light engine 50, which is configured in a similar fashion to that of FIG. 6. The exception is that the LEDs of the light source 54 are provided on the sides of the mixing chamber 56 and perpendicular to the rear surface of the optical assembly 52. Light from the LEDs from the light source 54 will emanate into the mixing chamber 56, and ultimately through the optical assembly 52 such that mixed light emanates from the front surface of the optical assembly 52. A light engine housing 58 may be provided to maintain the proper orientation of the optical assembly 52 and the light source 54, as well as provide the mixing chamber 56. Again, the LEDs of the light source 54 may provide different colors of light, wherein the mixing chamber 56 and the optical assembly 52 are configured such that light emanating from the front surface of the optical assembly 52 is of a desired color. The light sources 34, 44, and 54 need not be LEDs; however, LED-based light sources provide energy efficient and high quality light, as will be described further below. The optical assemblies 32, 42, and 52 may comprise one or more light/waveguides, diffusion films, lens films, diffusers, lenses, and the like.

FIG. 8 illustrates a partial cross-section of a skylight fixture 10, wherein each of the sun-resembling assemblies 16 employs back lit light engines 40. Further, the optical assembly 42 is angled such that the exposed surface of the optical assembly 42 forms an obtuse angle with the exposed surface of the sky-resembling assembly 14, which may employ a display assembly 24, light engine 30, light engine 40, or light engine 50, as described above. As illustrated, the light source 44 is an array of LEDs, wherein each LED of the array of LEDs is distributed along a vertical surface, which is orthogonal to the exposed surface of the sky-resembling assembly 14. A mixing chamber is provided between the LED array and the back surface of the optical assembly 42. While the LEDs of the LED array of the light source 44 are arranged on a vertical plane of the light engine housing 48, the plane on which the LEDs reside may also be angled, wherein the plane on which the LEDs are arranged is parallel to the optical assembly 42. In other embodiments, the plane on which the LEDs reside is not vertical, yet need not be parallel with the optical assembly 42.

In one embodiment, the appearance of the exposed surfaces of the sky-resembling and sun-resembling assemblies 14, 16 are configured to appear as a traditional skylight, which typically has painted, vertical side walls and a window. As such, the sun-resembling assemblies 16 may have optical assemblies 32, 42, 52, that have low gloss interior surfaces that are flat white in color. The interior surfaces are those that are visible once installed. The low gloss, flat white interior surfaces provide the appearance of the vertical side walls, which are typically painted flat white. The sun-resembling assemblies 16 will be of high efficacy and provide a CRI equal to or greater than 85 or 90 in addition to providing an R9 equal to or greater than 50. Ultra-uniform color mixing and uniform luminance across the interior surfaces of the optical assemblies 32, 42, 52 enhance the emulation effect.

The interior surfaces of the optical assembly 32, 42, 52 of the skylight fixture 10 may be a matt diffuser. For a waveguide embodiment, the optical assembly 32 will include a highly reflective backing on the back surface, which is opposite the interior surface. The sky-resembling assembly 14 should provide a CRI of or greater than 85 or 90 in addition to being color changeable. In one embodiment, the color can range from a sky blue to a very high correlated color temperature, such as white light within three, five, seven, or ten MacAdams ellipses of +/-5% of 5000K or 5500K, depending on the embodiment.

FIG. 9 illustrates an embodiment wherein multiple (six) skylight fixtures 10 are installed in a ceiling structure 12 in close proximity to one another to form an appealing matrix of virtual skylights. Through appropriate electronics, the light and/or images provided/displayed by each of the skylight fixtures 10 may be the same or coordinated as desired. For example, the movement of the sun, the passing of clouds, movement of shadows and the like may transition from one skylight fixture 10 to another to form a composite display and/or lighting effect from the overall group of skylight fixtures 10. Such operation may be tied to various sensors, information sensors, and the like, such that the light and/or information displayed by the skylight fixtures 10 corresponds to an associated outdoor environment. For additional information on coordinating the effects provided by the skylight fixtures 10 with outside environments, reference is made to U.S. provisional patent application Ser. No. 62/628,131, filed Feb. 8, 2018, which is incorporated herein by reference in its entirety.

As noted, each of the sky-resembling assembly 14 and the sun-resembling assemblies 16 may be configured the same or differently with respect to their lighting capabilities and characteristics. While different ones of the sun-resembling assemblies 16 may be configured differently on a given skylight fixture 10, they are generally configured the same on a given skylight fixture 10. Given the different objectives for the respective sky-resembling and sun-resembling assemblies 14, 16, the sky-resembling and sun-resembling assemblies 14, 16 may be designed to operate at different intensity levels, color spaces, color temperatures, distribution patterns, and the like as well as provide light at different efficacy levels or with different color rendering index values. Further, the different sky-resembling and sun-resembling assemblies 14, 16 may be designed and/or controlled such that each panel provides light with different characteristics, yet the light from the overall skylight fixture 10 combines to provide light with certain characteristics, which are different from that of either of the sky-resembling and sun-resembling assemblies 14, 16.

With certain embodiments, the sun-resembling assemblies 16 are designed to emulate the directional nature of sunlight passing through a traditional skylight. The sky-resembling assemblies 14 are designed to emulate the appearance of the sky and the non-directional nature of sunlight passing through a traditional skylight. The sky-resembling and sun-resembling assemblies 14, 16 may be further configured to emulate the appearance of light passing through or being reflected from window and side walls of the traditional skylight. One of the more significant lighting characteristics in achieving these goals is the color space, and in particular, the color point at which the respective sky-resembling and sun-resembling assemblies 14, 16 operate.

In certain embodiments, the light exiting the sky-resembling assembly 14 is relatively shifted toward blue in the light spectrum to better emulate the appearance of a blue sky. The light exiting the sun-resembling assembly 16 is relatively shifted toward the red in the light spectrum to better emulate the appearance of sunlight. In a first embodiment, the light exiting the sky-resembling assembly 14 has a color point within a first skylight color space A. As shown in FIG. 10A and listed in the table of FIG. 10B, the first skylight color space A is defined by the following x, y coordinates on the 1931 CIE Chromaticity Diagram: (0.37, 0.34), (0.35, 0.38), (0.15, 0.20), and (0.20, 0.14). The light exiting the sun-resembling assembly 16 has one or more color points within a first sunlight color space A. As shown in FIG. 11A and listed in the table of FIG. 11B, the first sunlight color space A is defined by the following x, y coordinates on the 1931 CIE Chromaticity Diagram: (0.29, 0.32), (0.32, 0.29), (0.41, 0.36), (0.48, 0.39), (0.48, 0.43), (0.40, 0.41), and (0.35, 0.38). Both the sky-resembling assembly 14 and the sun-resembling assemblies 16 may be configured to vary the color points during operation to emulate and/or track changing conditions of outside environments throughout the day and night.

In a second embodiment, the light exiting the sky-resembling assembly 14 has a color point within a second skylight color space B. As shown in FIG. 12A and listed in the table of FIG. 12B, the second skylight color space B is defined by the following x, y coordinates on the 1931 CIE Chromaticity Diagram: (0.32, 0.31), (0.30, 0.33), (0.15, 0.17), and (0.17, 0.14). The light exiting the sun-resembling assembly 16 has one or more color points within a second sunlight color space B. As shown in FIG. 13A and listed in the table of FIG. 13B, the second sunlight color space B is defined by the following x, y coordinates on the 1931 CIE Chromaticity Diagram: (0.30, 0.34), (0.30, 0.30), (0.39, 0.36), (0.45, 0.39), (0.47, 0.43), (0.40, 0.41), and (0.35, 0.38). Both the sky-resembling assembly 14 and the sun-resembling assemblies 16 may be configured to vary the color points during operation to emulate and/or track changing conditions of outside environments throughout the day and night.

The first and second embodiments defined above provide relatively limited color spaces for the respective sky-resembling and sun-resembling assemblies 14, 16 to operate. These embodiments are geared toward emulating a traditional skylight during predominately daylight hours between, but not necessarily including, the sunrise and sunset where the sky may appear less blue and more reddish orange. To expand the functionality of the skylight fixture 10 to better emulate the appearance of a traditional skylight outside of daylight hours, operation in expanded color spaces is beneficial. For example, the color spaces may need to be shifted or expanded to address the deeper blues associated with dusk, dawn, and nighttime as well as the more reddish orange and red hues associated with sunrise and sunset. Exemplary enhanced color spaces for the sky-resembling and sun-resembling assemblies 14, 16 are provided in a third embodiment.

In the third embodiment, the light exiting the sky-resembling assembly 14 has a color point within a third skylight color space C. As shown in FIG. 14A and listed in the table of FIG. 14B, the third skylight color space C is defined by the following x, y coordinates on the 1931 CIE Chromaticity Diagram: (0.39, 0.31), (0.34, 0.40), (0.10, 0.20), and (0.16, 0.06). The light exiting the sun-resembling assembly 16 has one or more color points within a third sunlight color space C. As shown in FIG. 15A and listed in the table of FIG. 15B, the third sunlight color space C is defined by the following x, y coordinates on the 1931 CIE Chromaticity Diagram: (0.28, 0.36), (0.35, 0.26), (0.44, 0.33), (0.62, 0.34), (0.50, 0.46), (0.43, 0.45), (0.36, 0.43). Both the sky-resembling assembly 14 and the sun-resembling assemblies 16 may be configured to vary the color points during operation to emulate and/or track changing conditions of outside environments throughout the day and night. The highlighted points in the graphs are exemplary color points for the respective sky-resembling and sun-resembling assemblies 14, 16.

In a fourth embodiment, the color spaces for both the sky-resembling and sun-resembling assemblies 14, 16 are greatly expanded and/or the same or substantially the same. As shown in FIG. 16A and listed in the table of FIG. 16B, the skylight and sunlight color spaces are defined by the following x, y coordinates on the 1931 CIE Chromaticity Diagram: (0.10, 0.20), (0.36, 0.43), (0.43, 0.45), (0.50, 0.46), (0.62, 0.34), (0.44, 0.33), (0.16, 0.06). Both the sky-resembling assembly 14 and the sun-resembling assemblies 16 may be configured to vary the color points during operation to emulate and/or track changing conditions of outside environments throughout the day and night. The highlighted points in the graphs are exemplary color points for the respective sky-resembling (square points) and sun-resembling (triangular points) assemblies 14, 16.

In any of the above or alternative embodiments, the ccx value on the 1931 CIE Chromaticity Diagram of the color point of light exiting the sky-resembling assembly 14 may be less or about equal than the ccx value on the 1931 CIE Chromaticity Diagram of the color point of light exiting the sun-resembling assembly 16. Alternatively, the ccy value on the 1931 CIE Chromaticity Diagram of the color point of light exiting the sky-resembling assembly 14 can be less or about equal than the ccy value on the 1931 CIE Chromaticity Diagram of the color point of light exiting the sun-resembling assembly 16. In other embodiments, both the ccx value on the 1931 CIE Chromaticity Diagram of the color point of light exiting the sky-resembling assembly 14 is less than or about equal the ccx value on the 1931 CIE Chromaticity Diagram of the color point of light exiting the sun-resembling assembly 16, and the ccy value on the 1931 CIE Chromaticity Diagram of the color point of light exiting the sky-resembling assembly 14 is less than or about equal the ccy value on the 1931 CIE Chromaticity Diagram of the color point of light exiting the sun-resembling assembly 16.

In LED-based embodiments, the arrays of LEDs are used for one or both of the sky-resembling and sun-resembling assemblies 14, 16. In the following embodiments, assume that LED arrays are used for both the sky-resembling and sun-resembling assemblies 14, 16. In the first embodiment, which is described in association with the 1931 CIE Chromaticity Diagram of FIG. 17, a two-color LED array is employed as the light source for the sky-resembling assembly 14. A two-color LED array will have multiple LEDs of a first color and multiple LEDs of a second color.

For this embodiment, the first LEDs are bluish LEDs that emit bluish light with a color point CP1 in the lower left of the 1931 CIE Chromaticity Diagram. The bluish LEDs have a 475 nm dominant wavelength and an overall spectrum that is illustrated in FIG. 18, which is a graph of output intensity versus wavelength. The second LEDs are a white LEDs that emit white light at a color point CP2 on or within three or five MacAdam Elilipses of the Black Body Curve. In this example, the white LEDs have a color temperature of approximately 5000K (+/−0.5, 1, 2, or 5%) and a color rendering index (CRI) of at least 85 or 90 (i.e. CRI 85, CRI 90). The white LEDs have an overall spectrum that is illustrated in FIG. 19, which is a graph of output intensity versus wavelength.

For a two-color LED array, the color point of light exiting the sky-resembling assembly 14 can vary along a tie line that extends between the color points associated with the bluish and white LEDs depending on the extent to which the respective LEDs are driven. In this embodiment, the color point of the light exiting the sky-resembling assembly 14 can vary in color along the tie line from white light with a color temperature of approximately 5000K to a sky blue. Three exemplary color points for sky targets are shown as circles on the tie line. While a two-color LED array is cost effective and provides variable color points along a defined tie line, the overall spectrum associated with the light emitted from a two-color LEDs array is somewhat limited.

One way to increase the overall spectral gamut of the emitted light from the sky-resembling assembly 14 is two use three or more LEDs in the LED array. Using three or more colors in the LED array is beneficial, even if the design dictates varying color along a single, linear tie line. An example of a three color-LED array is illustrated in the 1931 CIE Chromaticity Diagram of FIG. 20. In this example, deeper bluish LEDs, greenish LEDs, and white LEDs are employed. The deeper bluish LEDs emit bluish light with a color point CP3 in the lower left of the 1931 CIE Chromaticity Diagram. The bluish LEDs have a 460 nm dominant wavelength, but can range from about 450 nm to about 465 nm in dominant wavelength as illustrated in FIG. 21, which is a graph of output intensity versus wavelength.

The greenish LEDs emit greenish light with a color point CP5 in the upper left of the 1931 CIE Chromaticity Diagram. The greenish LEDs have a 520 nm dominant wavelength but can range from about 505 nm to about 530 nm in dominant wavelength as illustrated in FIG. 22, which is a graph of output intensity versus wavelength. The white LEDs emit white light at a color point CP5 on or within three or five MacAdam Elilipses of the Black Body Curve. In this example, the white LEDs have a color temperature of approximately 5000K (+/−0.5, 1, 2, or 5%) and a color rendering index (CRI) of at least 85 or 90 (i.e. CRI 85, CRI 90). The white LEDs have an overall spectrum that is illustrated in FIG. 23, which is a graph of output intensity versus wavelength. While certain colors of LEDs are used in the described embodiments, LEDs of various colors and combinations thereof are considered within the scope of the disclosure.

Similar concepts are used to design the sun-resembling assemblies 16. For example, the 1931 CIE Chromaticity Diagram of FIG. 24 shows three exemplary color spaces for each of three colors of LEDs. Color space CS1 resides in the upper left part of the diagram and corresponds to a greenish yellow LED that emits greenish yellow light. Color space CS2 resides in the lower left part of the diagram and corresponds to a greenish blue LED that emits greenish blue light. Color space CS3 resides in the lower right part of the diagram and corresponds to a reddish LED that emits reddish blue light. The combination of these three different colors of LEDs allows great flexibility in controlling the color and color temperature of the light exiting the sun-resembling assemblies 16. In a more focused application where the sun-resembling assemblies 16 are emulating solely or primarily sunlight and reflections thereof during sunrise, sunset, and daylight times, a target range for the color space resides along the Black Body curve and extends from about 5600K to 2700K, inclusive, within three, five, seven, or ten MacAdams ellipses.

For reference, color space CS1 is defined by the following x, y coordinates on the 1931 CIE Chromaticity Diagram: (0.337421, 0.498235), (0.361389, 0.547099), (0.345207, 0.557853), and (0.320079, 0.506653). Color space CS2 is defined by the following x, y coordinates on the 1931 CIE Chromaticity Diagram: (0.253872, 0.284229), (0.281968, 0.363411), (0.269385, 0.367235), and (0239191, 0.282521). Color space CS3 is defined by the following x, y coordinates on the 1931 CIE Chromaticity Diagram: (0.547946, 0.298632), (0.532764, 0.307913), (0.586923, 0.341618), and (0.602105, 0.332400). Again, these are non-limiting examples that are provided for the purposes aiding those skilled in the art in understanding the concepts described herein.

With reference to FIGS. 25 and 26, the skylight fixture 10 provides both vertical and horizontal lighting components. The vertical component is provided by the sky-resembling assembly 14, and the horizontal component is provided by the sun-resembling assemblies 16. Even though the sun-resembling assemblies 16 are not exactly vertical for the embodiment of FIG. 26, for the purposes herein, the sun-resembling assemblies 16 are considered to provide a horizontal lighting component. These vertical and horizontal lighting components ultimately combine to provide a composite lighting component that exits the skylight fixture 10 at an exit plane, which is a plane corresponding to the opening of the skylight fixture 10 opposite the sky-resembling assembly 14.

The vertical and horizontal lighting components are independently controllable with respect to one or more of intensity, color, color temperature, CRI, and the like. As such, the emission profile associated with the composite lighting component, which is effectively the output of the overall skylight fixture 10, can be tailored by controlling the vertical lighting component provided by the sky-resembling assembly 14 and the horizontal lighting components provide by the multiple sun-resembling assemblies 16. Notably, the horizontal lighting components provided by the different sun-resembling assemblies 16 may be the same or different to provide both symmetrical and asymmetrical emission profiles. For example, the skylight fixture 10 may be designed to provide the functionality described above and still have the composite lighting component provide a desired emission profile with a desired color, color temperature, CRI, or any combination thereof. The emission profile of the composite lighting component may have a normalized intensity distribution (i.e. substantially Lambertian Emission profile) to one that is substantially ellipsoidal, symmetrical, or asymmetrical.

Further, by employing three or more colors of LEDs for either or both of the sky-resembling and sun-resembling assemblies 14, 16, the white light color quality of the composite light output of the overall skylight fixture 10 can be significantly improved. In particular, the CRI of the composite light output of the overall skylight fixture 10 can be improved.

With regard to CRI, an LED-based fixture's CRI is calculated by measuring its CRI ratings for various individual colors, which are referred to as R1 through R8, and then taking an average of the results. Interestingly, R9 (red) and R13 (skin tone/beige) are generally not taken into consideration when calculating CRI. These red and skin tone colors have a significant impact on rendering skin colors in a healthy and natural way as well as making people feel at ease and more alert. As such, lighting may have a high CRI and still lack the red and skin tone color content necessary to properly render skin tones and/or enhance mood and alertness. The expanded spectrum provided by using LEDs of three or more colors for a given one of the sky-resembling and sun-resembling assemblies 14, 16 can improve the CRI rating as well as the perceived quality of the composite lighting component. The expanded spectrum may also significantly improve the quality of the vertical and horizontal lighting components.

FIGS. 27 and 28 illustrate the improvement in both CRI and R9 of the composite lighting component when employing LEDs of three or more colors. FIG. 27 is a graph of CRI and R9 over distance from center Nadir (that is six feet from the fixture) for the two-color LED embodiment of FIG. 17. Center Nadir in this test is approximately six feet from the center of the exit plane of the skylight fixture 10. FIG. 28 is a graph of CRI and R9 over distance from center Nadir for the three-color LED embodiment of FIG. 20. The CRI across the entire range significantly improved, and the CRI curve flattened, which indicates tremendous CRI improvement at lower distances. The R9 also improved on average.

FIGS. 29 and 30 illustrate techniques for improving efficacy associated with the overall skylight fixture 10, the sun-resembling assemblies 16, or both. FIG. 29 illustrates the benefit of having an angle of greater than 90 degrees between the interior face of the sun-resembling assemblies 16 and the sky-resembling assembly 14. In essence, the light output distribution of the sun-resembling assemblies 16 favors toward the exit plane, or in other words, is angled downward toward the exit plane. Angling the light output distribution of the sun-resembling assemblies 16 downward reduces the losses associated with the light being passed through and reflected by the light emitting surfaces of the other sun-resembling assemblies 16 and the sky-resembling assembly 14. Again, experiments have shown particularly effective performance when the obtuse angle α is:

90 degrees<α≤135;
95 degrees<α≤130; or
100 degrees<α≤125.

FIG. 30 illustrates another embodiment wherein the interior surfaces of the sun-resembling assemblies 16 are substantially vertical, but the optical configuration of the sun-resembling assemblies 16 are such that the light output distribution of the sun-resembling assemblies 16 is directed or redirected to favor toward the exit plane, or in other words, is angled downward toward the exit plane. This can be provided by angling the plane on which the LED array is provided, employing a diffusor or waveguide structure to redirect the light from the LED array, or the like. Allowing more of the light from the sun-resembling assemblies 16 to escape the skylight fixture 10 without impediment may also increase the emulation of sunlight passing through a traditional skylight at lower angles and more directly illuminating walls, such as during the morning or evening as well as during those fall, winter, and spring months of the year when the earth remains off axis relative to the sun (i.e. the sun is lower on the horizon through the day).

As described above, the respective sky-resembling and sun-resembling assemblies 14, 16 can be individually controlled such that light provided by the sky-resembling and sun-resembling assemblies 14, 16 can emit light at different color points at any given time. The particular color points for the light from the sky-resembling and sun-resembling assemblies 14, 16 may be permanently fixed or dynamically controlled such that the color points for the emitted light can change based on user input, a predefined program, or as a function of any number or combination of variables. The variables may range from date, day, and time of day to any number of sensor outputs, such as indoor and/or outdoor temperature sensors, light sensors, motion sensors, humidity sensors, rain sensors, and the like.

The sky-resembling and sun-resembling assemblies 14, 16 may be further controlled such that the composite lighting output of the skylight fixture 10 achieves a certain color, color temperature, CRI, and/or the like while achieving other lighting goals, such as emulating a traditional skylight in a fixed or dynamic manner. While emulating a traditional skylight has been the subject of much of the discussion thus far, the sky-resembling and sun-resembling assemblies 14, 16 may be controlled to enhance moods, support general and mental health, and/or provide other physiological benefits.

For example, the skylight fixture 10 may be configured to deliver an enhanced circadian stimulus, with reference to Rea, M. S. et al; A model of phototransduction by the human circadian system; Brain Research Reviews 50 (2005) 213-228, which is incorporated herein by reference in its entirety. This is done by controlling the ratio between the horizontal and vertical illuminance provided by the sky-resembling and sun-resembling assemblies 14, 16. The circadian stimulus is controlled by the spectral power distribution, the color temperature and the amount of light of the respective characteristics delivered to the human eye. Vertical illuminance, such as that provided by the sun-resembling assemblies 16, appears to have the greatest efficiency in delivering an impact on circadian rhythms. The skylight fixture 10, by virtue of its vertical and horizontal light emitting surfaces along with independent spectral and brightness control, can provide effective control of this stimulus. Controlling the sky-resembling and sun-resembling assemblies 14, 16 to provide a zonal luminance distribution of 35% or more in a region of 60-90 degrees of nadir will provide a higher vertical illuminance. This could be provided by increasing the brightness of the sun-resembling assemblies 16 and decreasing or maintaining the brightness of the sky-resembling assembly 14. Further, light with a higher amount of red spectral content may be emitted from the sun-resembling assemblies 16, further modulating the circadian or other alertness stimulation, as desired.

The skylight fixtures 10 may control the characteristics of light throughout the day based on when and how much circadian stimulus is desired. In the morning or during a certain time period in the morning, the skylight fixture 10 will increase its 60-90 degree illuminance to 35% or more and change the spectral power distribution and/or system vertical illuminance to provides a circadian stimulus of >0.3, which is a preferred circadian entrainment for humans according to Rea M S, Figueiro M G, Bierman A, Bullough J D.; J Circadian Rhythms; 2010 Feb. 13;8(1):2, which is incorporated herein by reference in its entirety. Later in the day, the skylight fixture 10 could reduce its circadian stimulus by providing a spectral power distribution and system vertical illuminance that results in a circadian stimulus of <0.1. One element of this reduction could be a change of the 60-90 degree zonal illuminance distribution 35% or less by modifying the sky-resembling and sun-resembling assembly 14, 16 emission (brightness and/or spectral content) ratios.

In another embodiment, the red spectral content provided by the sun-resembling assemblies 16 can be temporarily increased to increase the red vertical illuminance provided by the skylight fixture 10 during post lunch hours and/or at night to counter the so called "post-lunch dip" and/or to improve nighttime alertness of shift workers. For the potential of increasing the alertness of shift workers by exposing them to a vertical illuminance of red light, reference is made to Figueiro M. G. et al., Biological Research for Nursing 2016, Vol. 18(1) 90, which is incorporated by reference herein in its entirety. For the potential of increasing the alertness during the "post-lunch dip" in humans by providing increased red light exposure, reference is made to Sahin L., Figueiro M. G.; Physiology & Behavior, Vol. 116-117, 2013, 1, which is incorporated by reference herein in its entirety. Again, all of the above embodiments may be provided while or without maintaining desired characteristics of the composite lighting output for the skylight fixture 10.

Multiple skylight fixtures 10 may be controlled collectively by a remote source, by a master fixture, or in a distributed fashion to operate in concert to present a static or dynamic scene. Each of the skylight fixtures 10 may have different or the same light output of the respective sky-resembling and sun-resembling assemblies 14, 16, depending on the nature of the scene. In one scenario, each of the skylight fixtures 10 may provide the same light output for a scene, such that each of the skylight fixtures 10 has the same appearance for a uniform scene. In another scenario, two or more of the skylight fixtures 10 will have different light output configurations, wherein each skylight fixture 10 represents a portion of an overall scene. The skylight fixtures 10 may also be controlled to provide virtually any type of mood, theme, holiday, or like lighting as well wherein the color, color temperature, brightness, and spectral content of the light emitted from the sky-resembling and sun-resembling assemblies 14, 16 is only limited by the nature and capabilities of the light sources and the control thereof. The skylight fixtures 10 may be controlled or configured to operate in different modes at different times or in response to sensor input or outside control input.

For example, the skylight fixtures 10 may function to emulate a traditional skylight with a changing scene that tracks outside conditions during business hours and transitions to decorative accent lighting mode during non-business hours. Alternatively, the skylight fixtures 10 may transition to a mode that enhances alertness or provides some other type of circadian stimuli after normal business hours. Again, such control may be provided by a programming of the skylight fixture or remote control in isolation or based on various input from other sensors and the like. The independent control and the potential for different capabilities and configurations of the respective sky-resembling and sun-resembling assemblies 14, 16 provide tremendous flexibility for a skylight-shaped lighting fixture.

FIG. 31 shows a block diagram of a skylight fixture 10 that is capable of providing wired or wireless communications with a remote device 51. The remote device 51 may be another lighting fixture or skylight fixture 10, a remote control system provided on a server, personal computer, or the like, as well as a mobile computing device, such as a smart phone, commissioning tool, dedicated control module, and the like. Communications between the electronics module 18 and the remote device 51 may be wired or wireless and may work on any type of networking technology. The remote device 51 will include a central processing unit (CPU) 53 or the like, and associated memory 55, which will include the requisite software for controlling operation of the remote device 51 and communications with the electronics module 18. The CPU 53 may be associated with a communication interface 57, which will provide the requisite communication capability for the remote device 51.

FIG. 32 illustrates an exemplary electronics module 18 in association with a sky-resembling assembly 14 and one or more sun-resembling assemblies 16 for a skylight fixture 10. In the illustrated embodiment, the sky-resembling assembly 14 is expanded to illustrate an LED array, which includes a mixture of LEDs 59 of different colors. While those skilled in the art will recognize various color combinations, the following example employs white LEDs 59 that emit white light at a first wavelength, bluish LEDs 59 that emit bluish light at a second wavelength, and greenish LEDs 59 that emit greenish light at a third wavelength. The LED array may be divided into multiple strings of series-connected LEDs 59. In this embodiment, LED string LS1 includes the white LEDs 59 and forms a first group of LEDs. LED string LS2 includes the bluish LEDs 59 and forms a second group of LEDs. LED string LS3 includes the greenish LEDs 59 and forms a third group of LEDs.

The electronics module 18 controls the drive currents $i_1$, $i_2$, and $i_3$, which are used to drive the respective LED strings LS1, LS2, and LS3 of the sky-resembling assembly 14. The sun-resembling assemblies 16 may be similarly configured and driven by the same or different electronics modules 18 in similar fashion. The ratio of drive currents $i_1$, $i_2$, and $i_3$ that are provided through respective LED strings LS1, LS2, and LS3 may be adjusted to effectively control the relative intensities of the white light emitted from the white LEDs 59 of LED string LS1, the bluish light emitted from the bluish LEDs 59 of LED string LS2, and the greenish light emitted from the green LEDs 59 of LED string LS3. The resultant light from each LED string LS1, LS2, and LS3 mixes to generate an overall light output that has a desired color, correlated color temperature (CCT), and intensity, the latter of which may also be referred to as dimming level. As noted, the overall light output may take on any desired color or CCT.

When emulating a traditional skylight, the overall light output of the sky-resembling assembly 14 may range from a deep blue of an evening sky, to a medium blue of a daytime sky, to white light that falls on or within a desired proximity of the Black Body Locus (BBL) and has a desired CCT. The sun-resembling assemblies 16 are controlled in the same fashion to emulate direct and reflected sunlight as well as any of the other colors and CCTs described above for effects ranging from decorative to physiological.

The number of LED strings LSx may vary from one to many and different combinations of LED colors may be used in the different strings. Each LED string LSx may have LEDs of the same color, variations of the same color, or substantially different colors. In the illustrated embodiment, each LED string LS1, LS2, and LS3 is configured such that all of the LEDs 59 that are in the string are all essentially identical in color. However, the LEDs 59 in each string may vary substantially in color or be completely different colors in certain embodiments. A single string embodiment is also envisioned, wherein currents may be individually adjusted for the LEDs of the different colors using bypass circuits or the like.

The electronics module 18 includes AC-DC conversion circuitry 61, control circuitry 60, a communication interface (I/F) 62, and a number of current sources, such as the illustrated DC-DC converters 64. The AC-DC conversion circuitry 61 is configured to receive an AC signal (AC), rectify the AC signal, correct the power factor of the AC signal, and provide a DC power signal (PWR). The DC power signal may be used to directly or indirectly power the control circuitry 60 and any other circuitry provided in the electronics module 18, including the DC-DC converters 64 and the communication interface 62.

The three respective DC-DC converters 64 of the electronics module 18 provide drive currents $i_1$, $i_2$, and $i_3$ for the three LED strings LS1, LS2, and LS3 of the sky-resembling assembly 14 in response to control signals CS1, CS2, and CS3. As noted, additional drive circuitry may be provided for each of the sun-resembling assemblies 16 in similar fashion. The drive currents $i_1$, $i_2$, and $i_3$ may be pulse width modulated (PWM) signals or variable DC signals. If the drive currents $i_1$, $i_2$, and $i_3$ are PWM signals, the control signals CS1, CS2, and CS3 may be PWM signals that effectively turn the respective DC-DC converters 64 on during a logic high state and off during a logic low state of each period of the PWM signal. As a result, the drive currents $i_1$, $i_2$, and $i_3$ for the three LED strings LS1, LS2, and LS3 may also be PWM signals. The intensity of light emitted from each of the three LED strings LS1, LS2, and LS3 will vary based on the duty cycle of the respective PWM signals.

The control circuitry 60 will adjust the duty cycle of the drive currents $i_1$, $i_2$, and $i_3$ provided to each of the LED strings LS1, LS2, and LS3 to effectively adjust the intensity of the resultant light emitted from the LED strings LS1, LS2, and LS3 while maintaining the desired intensity, color and/or CCT based on instructions from the control circuitry 60. If the drive currents $i_1$, $i_2$, and $i_3$ for the three LED strings LS1, LS2, and LS3 are variable DC currents, the control circuitry 60 generates control signals CS1, CS2, and CS3 that result in the DC-DC converters 64 outputting the drive currents $i_1$, $i_2$, and $i_3$ at the appropriate DC levels.

The control circuitry 60 may include a central processing unit (CPU) 66, such as microprocessor or microcontroller, and sufficient memory 68 to store the requisite data and software instructions to enable the control circuitry 60 to function as described herein. The control circuitry 60 may interact with the communication interface 62 to facilitate wired or wireless communications with other skylight fixtures 10 or remote devices, as described above.

When the terms "control system" or "control circuitry" are used in the claims or generically in the specification, the term should be construed broadly to include the hardware and any additional software or firmware that is needed to provide the stated functionality. These terms should not be construed as only software, as electronics are needed to implement control systems described herein. For example, a control system may, but does not necessarily, include the control circuitry 60, the DC-DC converters 64, the AC-DC conversion circuitry 58, and the like.

The expression "correlated color temperature" ("CCT") is used according to its well-known meaning to refer to the temperature of a blackbody that is nearest in color, in a well-defined sense (i.e., can be readily and precisely determined by those skilled in the art). Persons of skill in the art are familiar with correlated color temperatures, and with Chromaticity diagrams that show color points to correspond to specific correlated color temperatures and areas on the diagrams that correspond to specific ranges of correlated color temperatures. Light can be referred to as having a correlated color temperature even if the color point of the light is on the blackbody locus (i.e., its correlated color temperature would be equal to its color temperature); that is, reference herein to light as having a correlated color temperature does not exclude light having a color point on the blackbody locus.

"Light engine" or "light source" can be any structure (or combination of structures) from which light exits. In many cases, a light engine consists of one or more light sources plus one or more mechanical elements, one or more optical elements and/or one or more electrical elements. In many cases, a light engine is a component of a light fixture, i.e., it is not a complete light fixture, but it can be a discrete group or set of LEDs that is spatially segregated and controlled as a unit. In some embodiments, for instance, a light engine in a light fixture can be a discrete set of LEDs (e.g., an array of LEDs) mounted to a board (e.g., a printed circuit board) that is separate from one or more other light engines in the light fixture. In some embodiments, a larger board can comprise different sets or groups of LEDs occupying different portions of the board, and thereby comprise multiple light engines. A light engine can, for example, comprise chip-on-board, packaged LEDs, secondary optics and/or control/drive circuitry. In some embodiments, a light fixture can comprise a first light engine comprising multiple LEDs on a first board, and a second light engine comprising multiple LEDs on a second board. In some embodiments, a light engine can comprise multiple LEDs spaced from each other (in the aggregate) in one dimension, in two dimensions or in three dimensions.

For example, a first light engine can be mounted adjacent to or spaced laterally from but on the same plane with a second light engine and thereby spaced in one dimension. A first light engine can be positioned adjacent to or spaced from a second light engine but positioned at an angle or on a second plane from the second light engine and thereby in two dimensions. A first light engine can be offset from a second light engine in two or three dimensions. A first light engine can be offset or positioned relative to two, three or more dimensions of one or more other light engines. In some embodiments, a light engine can comprise a single light source (e.g., a single LED), or an array of light sources (e.g., a plurality of LEDs, a plurality of other light sources, or a combination of one or more LEDs and/or one or more other light sources). In some embodiments, a plurality of light sources (e.g., a plurality of LEDs) can be on a board and controlled together, for example, a control device (that controls the color point of a mixture of light from the plurality of light sources, and/or that controls brightness of light emitted from one or more of the plurality of light sources, etc.) can control a plurality of light sources on a board (and/or can control all of the light sources on a board).

The expression "light exit region," "light exit surface," or "exit plane" (e.g., "at least a first light exit region is at a boundary of the space"), means any region through which light passes (e.g., as it travels from a space which is to one side of the light exit region to the other side of the light exit region, i.e., as it exits the space through the light exit region). For example, if a light fixture has a cylindrical surface that defines an internal space (closed at the top and open at the bottom), light can exit the space by traveling through the circular light exit region at the bottom of the cylindrical surface (i.e., such circular light exit region is defined by the lower edge of the cylindrical surface). Such a light exit region can be open, or it can be partially or completely occupied by a structure that is at least partially light-transmitting (e.g., transparent or translucent). For example, a light exit region can be an opening in an opaque structure (through which light can exit), a light exit region can be a transparent region in an otherwise opaque structure, a light exit region can be an opening in an opaque structure that is covered by a lens or a diffuser, etc.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

The color of visible light emitted by a light source, and/or the color of a mixture visible light emitted by a plurality of light sources can be represented on either the 1931 CIE (Commission International de l'Eclairage) Chromaticity Diagram or the 1976 CIE Chromaticity Diagram. Persons of skill in the art are familiar with these diagrams, and these diagrams are readily available.

The CIE Chromaticity Diagrams map out the human color perception in terms of two CIE parameters, namely, x (or ccx) and y (or ccy) (in the case of the 1931 diagram) or u' and v' (in the case of the 1976 diagram). Each color point on the respective diagrams corresponds to a particular hue. For a technical description of CIE chromaticity diagrams, see, for example, "Encyclopedia of Physical Science and Technology", vol. 7, 230-231 (Robert A Meyers ed., 1987). The spectral colors are distributed around the boundary of the outlined space, which includes all of the hues perceived by the human eye. The boundary represents maximum saturation for the spectral colors.

The 1931 CIE Chromaticity Diagram can be used to define colors as weighted sums of different hues. The 1976 CIE Chromaticity Diagram is similar to the 1931 Diagram, except that similar distances on the 1976 Diagram represent similar perceived differences in color.

The expression "hue", as used herein, means light that has a color shade and saturation that correspond to a specific point on a CIE Chromaticity Diagram, i.e., a color point that can be characterized with x, y coordinates on the 1931 CIE Chromaticity Diagram or with u', v' coordinates on the 1976 CIE Chromaticity Diagram.

In the 1931 CIE Chromaticity Diagram, deviation from a color point on the diagram can be expressed either in terms of the x, y coordinates or, alternatively, in order to give an indication as to the extent of the perceived difference in color, in terms of MacAdam ellipses (or plural-step MacAdam ellipses). For example, a locus of color points defined as being ten MacAdam ellipses (also known as "a ten-step MacAdam ellipse) from a specified hue defined by a particular set of coordinates on the 1931 CIE Chromaticity Diagram consists of hues that would each be perceived as differing from the specified hue to a common extent (and likewise for loci of points defined as being spaced from a particular hue by other quantities of MacAdam ellipses).

A typical human eye is able to differentiate between hues that are spaced from each other by more than seven MacAdam ellipses (and is not able to differentiate between hues that are spaced from each other by seven or fewer MacAdam ellipses).

Since similar distances on the 1976 Diagram represent similar perceived differences in color, deviation from a point on the 1976 Diagram can be expressed in terms of the coordinates, u' and v', e.g., distance from the point=$(\Delta u'^2+\Delta v'^2)^{1/2}$. This formula gives a value, in the scale of the u' v' coordinates, corresponding to the distance between points. The hues defined by a locus of points that are each a common distance from a specified color point consist of hues that would each be perceived as differing from the specified hue to a common extent.

A series of points that is commonly represented on the CIE Diagrams is referred to as the blackbody locus. The chromaticity coordinates (i.e., color points) that lie along the blackbody locus correspond to spectral power distributions that obey Planck's equation: $E(\lambda)=A\lambda^{-5}/(e^{(B/T)}-1)$, where E is the emission intensity, $\lambda$ is the emission wavelength, T is the temperature of the blackbody and A and B are constants. The 1976 CIE Diagram includes temperature listings along the blackbody locus. These temperature listings show the color path of a blackbody radiator that is caused to increase to such temperatures. As a heated object becomes incandescent, it first glows reddish, then yellowish, then white, and finally bluish. This occurs because the wavelength associated with the peak radiation of the blackbody radiator becomes progressively shorter with increased temperature, consistent with the Wien Displacement Law. Illuminants that produce light that is on or near the blackbody locus can thus be described in terms of their color temperature.

The expression "dominant wavelength" is used herein according to its well-known and accepted meaning to refer to the perceived color of a spectrum, i.e., the single wavelength of light which produces a color sensation most similar to the color sensation perceived from viewing light emitted by the light source, as opposed to "peak wavelength", which is well known to refer to the spectral line with the greatest power in the spectral power distribution of the light source. Because the human eye does not perceive all wavelengths equally (it perceives yellow and green better than red and blue), and because the light emitted by many solid state light emitters (e.g., light emitting diodes) is actually a range of wavelengths, the color perceived (i.e., the dominant wavelength) is not necessarily equal to (and often differs from) the wavelength with the highest power (peak wavelength). A truly monochromatic light such as a laser has a dominant wavelength that is the same as its peak wavelength.

It is well known that light sources that emit light of respective differing hues (two or more) can be combined to generate mixtures of light that have desired hues (e.g., non-white light corresponding to desired color points or white light of desired color temperature, etc.). It is also well known that the color point produced by mixtures of colors can readily be predicted and/or designed using simple geometry on a CIE Chromaticity Diagram. It is further well known that starting with the notion of a desired mixed light color point, persons of skill in the art can readily select light sources of different hues that will, when mixed, provide the desired mixed light color point.

For example, persons of skill in the art can select a first light engine (e.g., comprising a light emitting diode and phosphor), plot the color point of the light exiting from the first light engine (i.e., a first color point) on a CIE Chromaticity Diagram, plot a desired range of color points (or a single desired color point) for mixed light, and draw one or more line segments through the desired range of color points (or the single color point) for the mixed light such that the line segment(s) extend beyond the desired color point(s). Each line segment drawn in this way will have one end at the first color point, will pass through the range for the desired mixed light color point (or the desired single color point), and will have its other end at a second color point.

A second light engine can be provided from which light of the second color point exits, and when the first light engine and the second light engine are energized so that light exits from them, the color point of the mixed light will necessarily lie along a line segment connecting the first color point and the second color point, and the location of the color point of the mixed light along the line segment will be dictated by (namely, proportional to) the relative brightness of the respective light that exits from the first and second light engines. That is, the greater the proportion of the mixed light that is from the second light engine, the closer the color point of the mixed light is to the second color point; this relationship is geometrically proportional, i.e., the fraction of the length of the line segment that the color point of the mixed light is spaced from the first color point is equal to the fraction of the mixed light that is from the second light engine (and vice-versa). In geometric terms, the ratio of (1) the distance from the first color point to the color point of the mixed light, divided by (2) the distance from the first color point to the second color point will be equal to the ratio of the brightness (in lumens) of the first light engine divided by the brightness (in lumens) of the combination of light in the mixed light. Accordingly, once one identifies light sources (or light engines) that provide the endpoints of a line segment that extends through the desired mixed light color point, the desired mixed light color point can be obtained by calculating the relative brightness of the first and second light sources (or light engines) necessary to arrive at the desired mixed light color point.

Where more than two light sources (and/or light engines) are used (e.g., where there is mixed light of a first color point from a first light source, light of a second color point from a second light source, and light of a third color point from a third light source), the geometrical relationships can be used to ensure that the desired mixed light color point is obtained (e.g., conceptually, the color point of a sub-mixture of light from the first light source (or the first light engine) and the second light source (or the second light engine) can be determined, and then the color point of a mixture or sub-mixture (having a brightness of the combined brightness of the first light source (or the first light engine) and the second light source (or the second light engine) and the third light source (or the third light engine) can be determined, and the range of mixed light color points that can be reached is defined by the perimeter obtained from drawing lines connecting the respective color points of the light sources (and/or light engines).

Those skilled in the art will recognize improvements and modifications to the preferred embodiments of the present disclosure. All such improvements and modifications are considered within the scope of the concepts disclosed herein and the claims that follow.

What is claimed is:

1. A skylight fixture comprising:
a skylight assembly comprising a skylight optical assembly and a sky-specific light source wherein light from the sky-specific light source exits a planar interior surface of the sky-resembling optical assembly as skylight light;
a plurality of sun-resembling assemblies that are arranged adjacent one another and extend downward from a periphery of the sky-resembling assembly, each of the plurality of sun-resembling assemblies comprising a sun-resembling optical assembly and a sun-specific light source wherein light from the sun-specific light source exits a planar interior surface of the sun-resembling optical assembly as sunlight light, wherein the planar interior surfaces of the sky-resembling optical assembly and the plurality of sun-resembling optical assemblies define a cavity; and
at least one control module configured to, in a first mode, drive the sky-specific light source and each sun-specific light source such that the skylight light has a first color point and the sunlight light of at least one of the plurality of sun-resembling assemblies has a second color point that is different from the first color point, wherein one of the sky-specific light source and the sun-specific light source comprises first LEDs that emit light having a third color point, second LEDs that emit light having a fourth color point, and third LEDs that emit light having a fifth color point.

2. The skylight light fixture of claim 1 wherein the third color point, the fourth color point, and the fifth color point are spaced apart from one another on a 1931 CIE Chromaticity Diagram by at least 0.05 in at least one of x and y directions.

3. The skylight fixture of claim 2 wherein the first LEDs emit white light and the third color point is within seven MacAdams Ellipses of a blackbody curve.

4. The skylight fixture of claim 3 wherein the second LEDs emit bluish light, the third LEDs emit greenish light, and a y coordinate value of the fourth color point and a y coordinate value of the fifth color point on the 1931 CIE Chromaticity Diagram differ by at least 0.1.

5. The skylight fixture of claim 4 wherein the sky-specific light source comprises the first LEDs, the second LEDs, and the third LEDs.

6. The skylight fixture of claim 5 wherein:
at least two of the sun-specific light sources comprise fourth LEDs that emit light having a sixth color point, fifth LEDs that emit light having a seventh color point, and sixth LEDs that emit light having an eighth color point; and
the sixth color point, the seventh color point, and the eighth color point are spaced apart from one another on the 1931 CIE Chromaticity Diagram by at least 0.05 in at least one of the x and y directions.

7. The skylight fixture of claim 1 wherein the at least one sun-specific light source comprises the first LEDs, the second LEDs, and the third LEDs.

8. The skylight fixture of claim 7 wherein the third color point, the fourth color point, and the fifth color point are spaced apart from one another on a 1931 CIE Chromaticity Diagram by at least 0.05 in at least one of x and y directions.

9. The skylight fixture of claim 1 wherein:
at least two of the sun-specific light sources comprise the first LEDs that emit light having the third color point, the second LEDs that emit light having the fourth color point, and the third LEDs that emit light having the fifth color point; and
the third color point, the fourth color point, and the fifth color point are spaced apart from one another on the 1931 CIE Chromaticity Diagram by at least 0.05 in at least one of x and y directions.

10. The skylight fixture of claim 1 wherein an interior angle formed between the planar interior surface of the sky-resembling optical assembly and the planar interior surface of each of the sun-resembling optical assemblies is an obtuse angle.

11. The skylight fixture of claim 10 wherein the interior angle is greater than 90 degrees and less than or equal to 135 degrees.

12. The skylight fixture of claim 10 wherein the interior angle is greater than or equal to 95 degrees and less than or equal to 130 degrees.

13. The skylight fixture of claim 10 wherein the interior angle is greater than or equal to 100 degrees and less than or equal to 125 degrees.

14. The skylight fixture of claim 1 wherein:
an x coordinate value of the first color point and an x coordinate value of the second color point on a 1931 CIE Chromaticity Diagram differ by at least 0.1; and
the first color point falls within a first color space defined by x, y coordinates on the 1931 CIE Chromaticity Diagram: (0.37, 0.34), (0.35, 0.38), (0.15, 0.20), and (0.20, 0.14); and
the second color point falls within a second color space defined by x, y coordinates on the 1931 CIE Chromaticity Diagram: (0.29, 0.32), (0.32, 0.29), (0.41, 0.36), (0.48, 0.39), (0.48, 0.43), (0.40, 0.41), and (0.35, 0.38).

15. The skylight fixture of claim 1 wherein:
an x coordinate value of the first color point and an x coordinate value of the second color point on a 1931 CIE Chromaticity Diagram differ by at least 0.1; and
the first color point falls within a first color space defined by x, y coordinates on the 1931 CIE Chromaticity Diagram: (0.32, 0.31), (0.30, 0.33), (0.15, 0.17), and (0.17, 0.14); and
the second color point falls within a second color space defined by x, y coordinates on the 1931 CIE Chromaticity Diagram: (0.30, 0.34), (0.30, 0.30), (0.39, 0.36), (0.45, 0.39), (0.47, 0.43), (0.40, 0.41), and (0.35, 0.38).

16. The skylight fixture of claim 1 wherein:
an x coordinate value of the first color point and an x coordinate value of the second color point on a 1931 CIE Chromaticity Diagram differ by at least 0.1; and
the first color point falls within a first color space defined by x, y coordinates on the 1931 CIE Chromaticity Diagram: (0.39, 0.31), (0.34, 0.40), (0.10, 0.20), and (0.16, 0.06); and
the second color point falls within a second color space defined by x, y coordinates on the 1931 CIE Chromaticity Diagram: (0.28, 0.36), (0.35, 0.26), (0.44, 0.33), (0.62, 0.34), (0.50, 0.46), (0.43, 0.45), (0.36, 0.43).

17. The skylight fixture of claim 1 wherein:
an x coordinate value of the first color point and an x coordinate value of the second color point on a 1931 CIE Chromaticity Diagram differ by at least 0.1; and
the first color point falls within a first color space defined by x, y coordinates on the 1931 CIE Chromaticity Diagram: (0.39, 0.31), (0.34, 0.40), (0.10, 0.20), and (0.16, 0.06); and
the second color point falls within a second color space defined by x, y coordinates on the 1931 CIE Chromaticity Diagram: (0.28, 0.36), (0.35, 0.26), (0.44, 0.33), (0.62, 0.34), (0.50, 0.46), (0.43, 0.45), (0.36, 0.43).

18. The skylight fixture of claim 1 wherein:
an x coordinate value of the first color point and an x coordinate value of the second color point on a 1931 CIE Chromaticity Diagram differ by at least 0.1; and
the first color point falls within a first color space defined by x, y coordinates on the 1931 CIE Chromaticity Diagram: (0.10, 0.20), (0.36, 0.43), (0.43, 0.45), (0.50, 0.46), (0.62, 0.34), (0.44, 0.33), (0.16, 0.06); and
the second color point falls within a second color space defined by x, y coordinates on the 1931 CIE Chromaticity Diagram: (0.10, 0.20), (0.36, 0.43), (0.43, 0.45), (0.50, 0.46), (0.62, 0.34), (0.44, 0.33), (0.16, 0.06).

19. The skylight fixture of claim 1 wherein an x coordinate value of the first color point and an x coordinate value of the second color point on a 1931 CIE Chromaticity Diagram differ by at least 0.15.

20. The skylight fixture of claim 1 wherein an x coordinate value of the first color point and an x coordinate value of the second color point on a 1931 CIE Chromaticity Diagram differ by at least 0.2.

21. The skylight fixture of claim 1 wherein an x coordinate value of the first color point is less than an x coordinate value of the second color point on a 1931 CIE Chromaticity Diagram.

22. The skylight fixture of claim 1 wherein a y coordinate value of the first color point is less than a y coordinate value of the second color point on a 1931 CIE Chromaticity Diagram.

23. The skylight fixture of claim 1 wherein:
an x coordinate value of the first color point is less than an x coordinate value of the second color point on a 1931 CIE Chromaticity Diagram; and
a y coordinate value of the first color point is less than a y coordinate value of the second color point on the 1931 CIE Chromaticity Diagram.

24. The skylight fixture of claim 1 wherein an x coordinate value of the first color point and an x coordinate value of the second color point on a 1931 CIE Chromaticity Diagram differ by at least 0.15.

25. The skylight fixture of claim 1 wherein the skylight light and the sunlight light provide a composite light output that has a color rendering index of greater than 90.

26. The skylight fixture of claim 1 wherein the sky-resembling assembly emulates a window of a traditional skylight and each of the plurality of sun-resembling assemblies emulates sunlight passing through and reflecting off of sidewalls of the traditional skylight.

27. The skylight fixture of claim 1 wherein the at least one control module is further configured to independently and variably drive the sky-specific light source and each sun-specific light source such that the first color point and the second color point are independently variable.

28. The skylight fixture of claim 1 wherein the at least one control module is further configured to drive the sky-specific light source and each sun-specific light source such that the first color point and the second color point change temporally.

29. The skylight fixture of claim 1 wherein the at least one control module is further configured to drive the sky-specific light source and each sun-specific light source such that the first color point and the second color point are selected based on a time of day.

30. The skylight fixture of claim 1 wherein the at least one control module is further configured to drive the sky-specific light source and each sun-specific light source such that the first color point and the second color point are selected based on information received from a remote device.

31. The skylight fixture of claim 1 wherein the at least one control module is further configured to drive the sky-specific light source and each sun-specific light source such that the first color point and the second color point are selected based on sensor information provided by at least one sensor.

32. The skylight fixture of claim 1 wherein the at least one control module is further configured to drive the sky-specific light source and each sun-specific light source such that the first color point and the second color point are selected based on outdoor lighting conditions.

33. The skylight fixture of claim 1 wherein the at least one control module is further configured to drive the sky-specific light source and each sun-specific light source such that the first color point and the second color point are selected based on outdoor weather conditions.

34. The skylight fixture of claim 1 wherein the at least one control module is further configured to drive the sky-specific light source and each sun-specific light source such that the first color point and the second color point are selected based on outdoor environmental conditions.

35. The skylight fixture of claim 1 wherein the at least one control module is further configured to, in a second mode, drive each sun-specific light source to change the second color point of the sun-specific light provided by each sun-specific light source to provide a circadian stimulus.

36. The skylight fixture of claim 1 wherein the at least one control module is further configured to, in a second mode, drive each sun-specific light source to change the second color point of the sunlight light provided by each sun-specific light source to have additional red spectral content.

37. The skylight fixture of claim 1 wherein the at least one control module is further configured to communicate with other skylight fixtures and drive the sky-specific light source and each sun-specific light source such that the skylight light and the sunlight light are coordinated with that from the other skylight fixtures.

* * * * *